United States Patent
Wakashiro et al.

(10) Patent No.: US 6,693,650 B2
(45) Date of Patent: Feb. 17, 2004

(54) IMAGE PROCESSING COMPUTER SYSTEM FOR A PHOTOGRAMMETRIC ANALYTICAL MEASUREMENT

(75) Inventors: Shigeru Wakashiro, Tokyo (JP); Toshihiro Nakayama, Saitama (JP)

(73) Assignee: Pentax Corporation, Tokyo (JP)

( * ) Notice: Subject to any disclaimer, the term of this patent is extended or adjusted under 35 U.S.C. 154(b) by 252 days.

(21) Appl. No.: 09/809,098

(22) Filed: Mar. 16, 2001

(65) Prior Publication Data

US 2001/0024209 A1 Sep. 27, 2001

(30) Foreign Application Priority Data

Mar. 17, 2000 (JP) .................................. P2000-075549

(51) Int. Cl.$^7$ ................................................. G09G 5/00
(52) U.S. Cl. .................................... 345/788; 345/782
(58) Field of Search ............................... 345/419, 781, 345/782, 788

(56) References Cited

U.S. PATENT DOCUMENTS

| | | | |
|---|---|---|---|
| 5,699,444 A | 12/1997 | Palm | |
| 5,995,765 A | 11/1999 | Kaneko et al. | |
| 6,144,761 A | 11/2000 | Kaneko et al. | |
| 6,516,099 B1 * | 2/2003 | Davison | 345/419 |

FOREIGN PATENT DOCUMENTS

| | | |
|---|---|---|
| JP | 10141951 | 5/1998 |
| JP | 10170263 | 6/1998 |
| JP | 10185562 | 7/1998 |
| JP | 10185563 | 7/1998 |
| JP | 10221072 | 8/1998 |
| JP | 10293026 | 11/1998 |
| JP | 10307025 | 11/1998 |

OTHER PUBLICATIONS

English Language Abstract of JP 10–221072.
English Language Abstract of JP 10–141951.
English Language Abstract of JP 10–170263.
English Language Abstract of JP 10–185562.
English Language Abstract of JP 10–185563.
English Language Abstract of JP 10–307025.

* cited by examiner

Primary Examiner—Matthew Luu
(74) Attorney, Agent, or Firm—Greenblum & Bernstein, P.L.C.

(57) ABSTRACT

In image processing computer system for a photogrammetric analytical measurement in which a survey map is produced on the basis of plural pairs of pictures photographed at different positions, each picture features a photographed target. Plural frames of image data for producing the pictures are stored in a memory, and the frames of image data are read from the memory in a given order such that two consecutive frames of image data are handled as a pair of pictures. A monitor displays two pictures side by side, which are rearranged until two pictures displayed side by side form a proper pair for producing a survey map section. It is determined whether respective two pictures displayed side by side are defined as left-hand and right-hand pictures or right-hand and left-hand pictures with respect to the targets photographed thereon, whereby respective left-hand and right-hand pictures in each pair are displayed at left and right sides on the monitor.

8 Claims, 21 Drawing Sheets

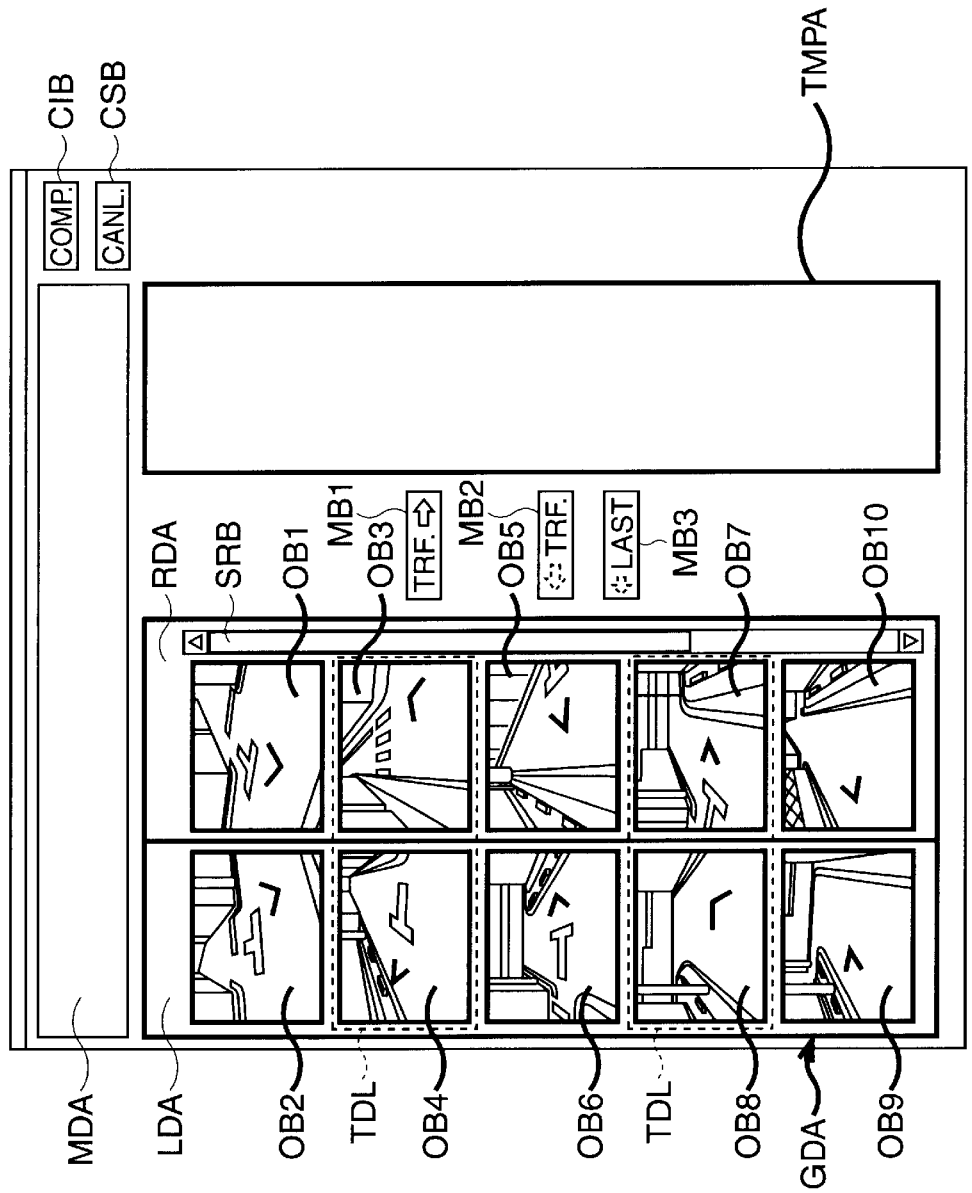

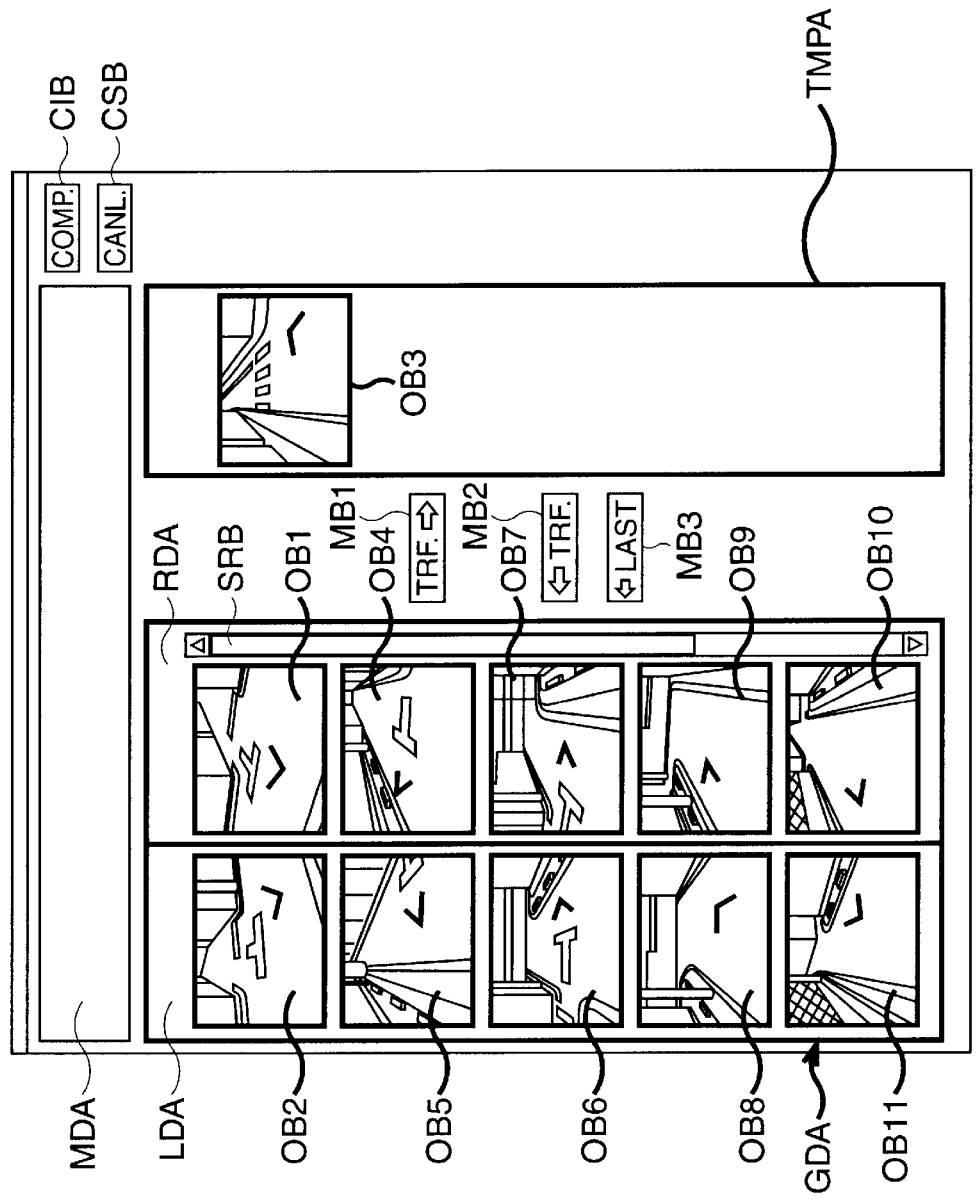

FIG. 8A

| Use/List | Use/List Number | 1 | 2 | 3 | 4 | 5 | 6 | 7 | 8 | 9 | 10 | 11 |
|---|---|---|---|---|---|---|---|---|---|---|---|---|
| | Picture Name | IM1 | IM2 | IM3 | IM4 | IM5 | IM6 | IM7 | IM8 | IM9 | IM10 | IM11 |
| Unuse/List | Unuse/List Number | | | | | | | | | | | |
| | Picture Name | | | | | | | | | | | |
| Thumbnail/List | Thumbnail/List Number | | | | | | | | | | | |
| | Use/List Number | | | | | | | | | | | |

FIG. 8B

| Use/List | Use/List Number | 1 | 2 | 3 | 4 | 5 | 6 | 7 | 8 | 9 | 10 | 11 |
|---|---|---|---|---|---|---|---|---|---|---|---|---|
| | Picture Name | IM1 | IM2 | IM3 | IM4 | IM5 | IM6 | IM7 | IM8 | IM9 | IM10 | IM11 |
| Unuse/List | Unuse/List Number | | | | | | | | | | | |
| | Picture Name | | | | | | | | | | | |
| Thumbnail/List | Thumbnail/List Number | 1 | 2 | 3 | 4 | 5 | 6 | 7 | 8 | 9 | 10 | 11 |
| | Use/List Number | 2 | 1 | 4 | 3 | 6 | 5 | 8 | 7 | 9 | 10 | 11 |

FIG. 8C

| Use/List | Use/List Number | 1 | 2 | 3 | 4 | 5 | 6 | 7 | 8 | 9 | 10 | |
|---|---|---|---|---|---|---|---|---|---|---|---|---|
| | Picture Name | IM1 | IM2 | IM4 | IM5 | IM6 | IM7 | IM8 | IM9 | IM10 | IM11 | |
| Unuse/List | Unuse/List Number | 1 | | | | | | | | | | |
| | Picture Name | IM3 | | | | | | | | | | |
| Thumbnail/List | Thumbnail/List Number | 1 | 2 | 3 | 4 | 5 | 6 | 7 | 8 | 9 | 10 | 11 |
| | Use/List Number | 2 | 1 | 4 | 3 | 6 | 5 | 8 | 7 | 9 | 10 | 11 |

FIG. 8D

| Use/List | Use/List Number | 1 | 2 | 3 | 4 | 5 | 6 | 7 | 8 | 9 | 10 |
|---|---|---|---|---|---|---|---|---|---|---|---|
| | Picture Name | IM1 | IM2 | IM4 | IM5 | IM6 | IM7 | IM8 | IM9 | IM10 | IM11 |
| Unuse/List | Unuse/List Number | 1 | | | | | | | | | |
| | Picture Name | IM3 | | | | | | | | | |
| Thumbnail/List | Thumbnail/List Number | 1 | 2 | 3 | 4 | 5 | 6 | 7 | 8 | 9 | 10 |
| | Use/List Number | 2 | 1 | 4 | 3 | 5 | 6 | 7 | 8 | 10 | 9 |

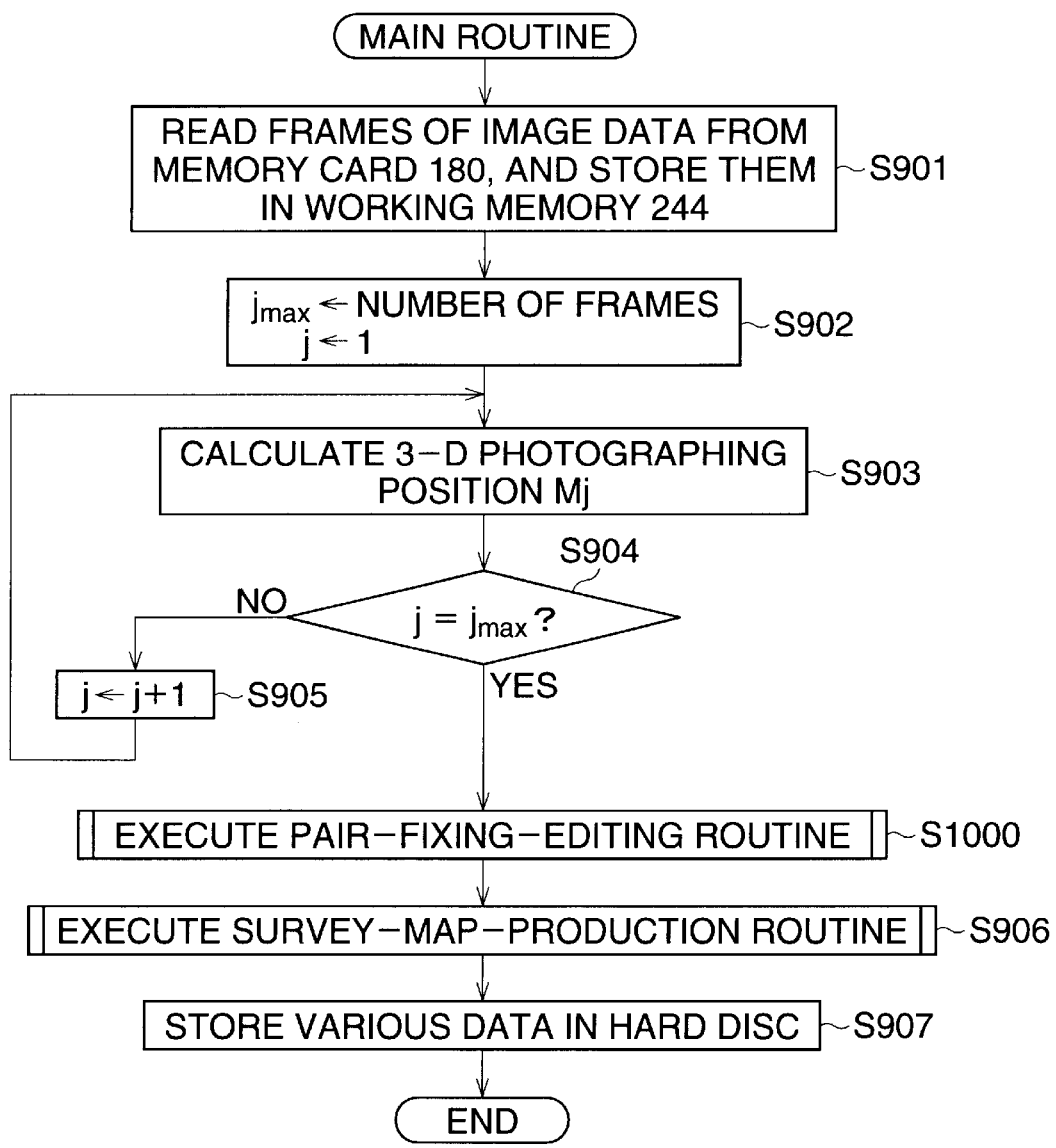

IMAGE PROCESSING COMPUTER SYSTEM FOR A PHOTOGRAMMETRIC ANALYTICAL MEASUREMENT

BACKGROUND OF THE INVENTION

1. Field of the Invention

The present invention relates to an image-processing computer system for a photogrammetric analytical measurement, in which a survey map is electronically produced on the basis of a pair of photographed pictures which are obtained at two different photographing positions.

2. Description of the Related Art

For example, photogrammetry is carried out at a traffic accident spot. The traffic accident spot is photographed by an electronic still video digital camera in at least two different positions, and a survey map of the traffic accident spot is produced on the basis of a pair of photographed pictures obtained at the different positions, as disclosed in, for example, Unexamined Japanese Patent Publications No.10-221072 and No.10-293026.

Before accurately scaled distances and lengths can be reproduced on the survey map, a standard measurement scale, which is usually called a target, must be recorded together with the photographed objects in the pictures. The target is disclosed in, for example, Unexamined Japanese Patent Publications No.10-141951, No.10-170263, No.10-185562, No.10-185563, No.10-293026 and No.10-307025.

For the production of the survey map, a two-dimensional coordinate system is defined on each of the pictures, and two-dimensional positions of the objects, which are recorded on each picture, are determined by the two-dimensional coordinate system. Then, a three-dimensional coordinate system is defined on the target, and three-dimensional positions of the recorded objects are calculated based on the two-dimensional positions of the objects with respect to the three-dimensional coordinate system. Thus, it is possible to produce a survey map by projecting the three-dimensional coordinates, representing the objects, on one of the three planes defined by the three-dimensional system. Of course, the production of the survey map is performed using an image-processing computer system.

For example, to produce a long portion of a roadway as a survey map, it is necessary to obtain plural pairs of pictures to cover the length of the roadway, and the target must be moved from one position to another position in the length of the roadway. In this case, a survey map section is produced on the basis of each pair of pictures, and the survey map is obtained by successively connecting the survey map sections to each other.

Preferably, a series of photographing operations for the photogrammetric measurement should be performed in order, so that a pair of pictures for producing a survey map section can be more easily selected and recognized from among a plurality of pictures obtained by the series of photographing operations.

Nevertheless, during the series of photographing operations for the photogrammetric measurement, an additional photographing operation may be frequently performed to photograph and record, for example, evidence or circumstances concerning the traffic accident that are not associated with the measurement. Of course, the intervention of the additional photographing operation results in a disruption to the proper order of the photographing operations for the measurement. Furthermore, in reality, the photographing operations for the measurement may not be consecutively performed for various reasons.

Therefore, it is necessary to rearrange the pictures for the photogrammetric measurement, before each pair of pictures required to produce a survey map section can be efficiently and easily fixed as a matching pair.

SUMMARY OF THE INVENTION

Therefore, an object of this invention is to provide an image processing computer system for a photogrammetric analytical measurement, which is constituted such that matching pictures required for the measurement can be easily and efficiently rearranged to facilitate the correct combination for producing a survey map section.

In accordance with the present invention, there is provided an image processing computer system for a photogrammetric analytical measurement in which a survey map is produced on the basis of plural pairs of pictures photographed at different positions, each picture featuring a photographed target.

In the image processing computer system according to an aspect of the invention, a memory stores plural frames of image data for producing the pictures, and an image-data-reading controller reads the plural frames of image data from the memory in a predetermined order such that two consecutive frames of image data are handled as forming a pair of pictures. A monitor displays two pictures in each pair side by side thereon to rearrange the displayed pictures such that two pictures displayed side by side forms a proper pair for producing a survey map section, and a determination system determines whether respective two pictures displayed side by side are defined as left-hand and right-hand pictures or right-hand and left-hand pictures with respect to the targets photographed thereon, whereby respective left-hand and right-hand pictures in each pair are displayed at left and right sides on the monitor.

In the image processing computer system according to another aspect of the present invention, a first monitor controller displays respective two pictures in each pair side by side on the left-hand and right-hand display areas of the picture-arranging display area, a second monitor controller transfers a displayed picture from the picture-arranging display area to the picture-shunting display area, and a third monitor controller returns the transferred picture from the picture-shunting display area to the picture-arranging display area such that the picture to be returned is displayed at a desired display location on the picture-arranging display area. The pictures, displayed on the picture-arranging display area, are rearranged using the second and third monitor controllers such that two pictures, displayed side by side on the left-hand and right-hand display areas of the picture-arranging display area, forms a proper pair for producing a survey map section. The first monitor controller has a determination system that determines whether respective two pictures displayed side by side are defined as left-hand and right-hand pictures or right-hand and left-hand pictures with respect to the targets photographed thereon, whereby respective left-hand and right-hand pictures in each pair are displayed on the left-hand and right-hand display areas of the picture-arranging display area.

The determination system may comprises a first calculation system that calculates respective photographing positions of the pictures displayed side by side with respect to coordinate systems defined on the photographed targets, a vector-definition system that defines respective two vectors directed from origins of the coordinate systems to the respective photographing positions, and a second calculation system that calculates an outer product of the two vectors, whereby the determination is performed by the determination system on the basis of whether the calculated outer product is positive or negative.

The respective two vectors are defined as first and second vectors derived from the two pictures in each pair which are consecutively read from the memory, and the outer product is calculated by the second calculation system as an outer product of the second vector to the first vector. When the outer product is positive, the respective two pictures, represented by the first and second vectors, are defined as the left-hand and right-hand pictures by the determination system. When the outer product is negative, the respective two pictures, represented by the first and second vectors, are defined as the right-hand and left-hand pictures by the determination system.

The memory may be a memory card. In this case, the image processing computer system further comprises a memory card reader in which the memory card is loaded. Also, the memory may be a working memory forming a part of the image processing computer system.

BRIEF DESCRIPTION OF THE DRAWINGS

The object and other objects of the invention will be better understood from the following description, with reference to the accompanying drawings, in which:

FIG. 7A is a view showing by way of example a pair-fixing-editing scene of a monitor shown in FIG. 6;

FIG. 7B is a view, similar to FIG. 7A, the pair-fixing-editing scene at an aspect different from FIG. 7A;

FIG. 8A is a conceptual view showing a display list table defined in a working memory shown in FIG. 6, to manage the display of pictures or objects in the pair-fixing-editing scene shown in FIGS. 7A and 7B;

FIG. 8B is a conceptual view, similar to FIG. 8A, showing the display list table at an aspect different from FIG. 8A;

FIG. 8C is a conceptual view, similar to FIGS. 8A and 8B, showing the display list table at another aspect different from FIGS. 8A and 8B;

FIG. 8D is a conceptual view, similar to FIGS. 8A, 8E, and 8C, showing the display list table at yet another aspect different from FIGS. 8A, 8B, and 8C;

FIG. 9 is a flowchart of a main routine executed in the photogrammetric image processing computer system according to the invention;

DESCRIPTION OF THE PREFERRED EMBODIMENTS

Figure 1:
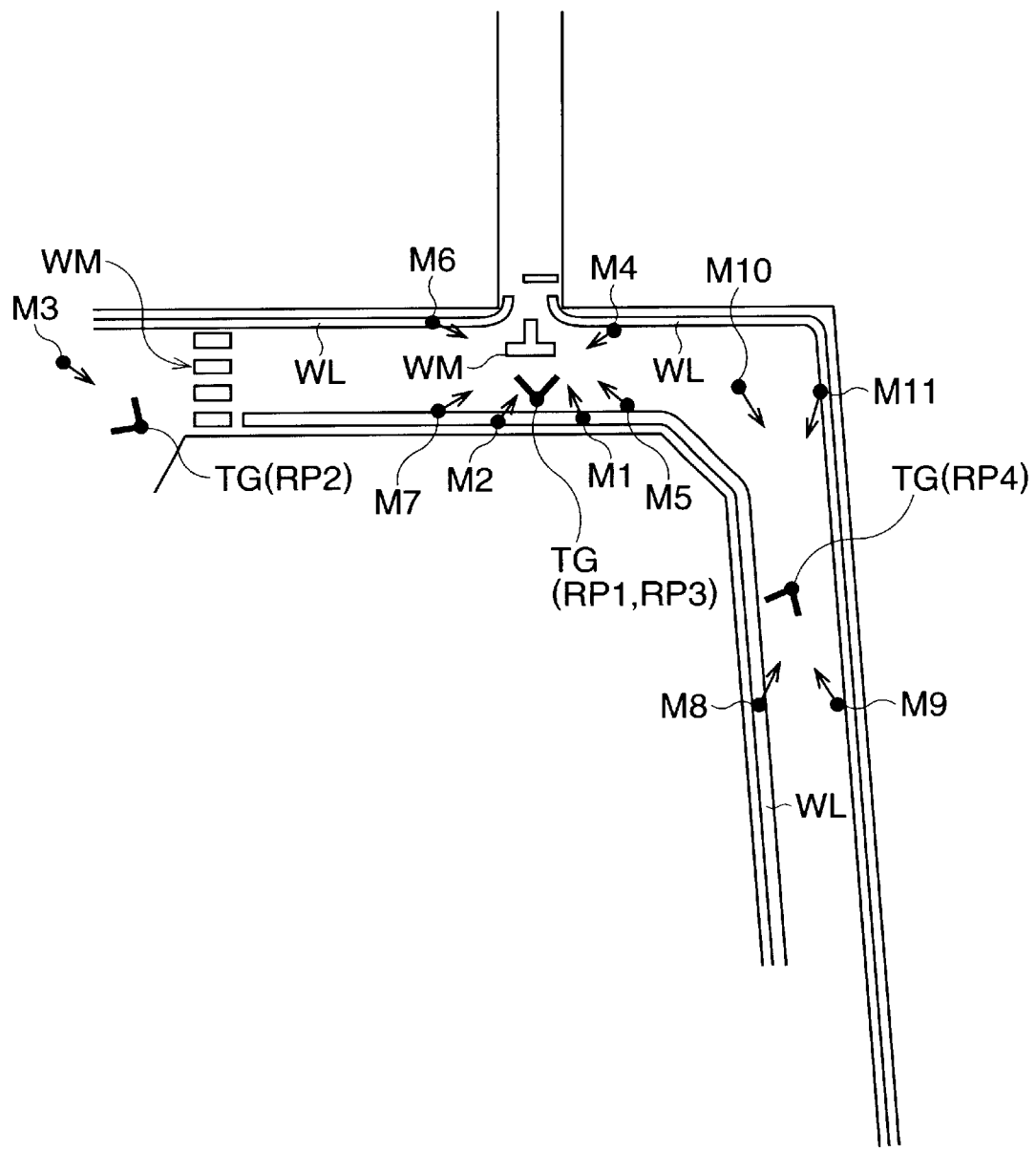
FIG. 1 is a plan view of a roadway for explaining a photogrammetric measurement, which utilizes a photogrammetric image processing computer system according to the invention.

With reference to FIG. 1, a roadway is shown as a plan view, by way of example, for explaining a photogrammetric analytical measurement, which utilizes a photogrammetric image processing computer system of the present invention. In this example, the roadway is photographed by an electronic still video digital camera at eleven photographing positions, which are represented by small solid circles indicated by references M1 to M11, respectively. Each of the eleven pictures, photographed at the photographing positions M1 to M11, is processed by a control circuit of the digital camera, and is then stored as a frame of image data in a memory medium, such as an IC memory card, held in the camera.

Each of the photographing positions M1 to M11 is defined as a back principal point of a photographing lens system of the camera. As shown in FIG. 1, an arrow is projected from each of the photographing positions M1 to M11 to indicate the photographing direction at the corresponding photographing position (M1, M2, . . . , M10, M11), and the photographing direction is defined as an orientation of the optical axis of the photographing optical lens system of the camera.

The eleven photographing operations are performed in the order of the photographing positions M1 to M11. Also, when each of the photographing operations is performed, an object to be surveyed is photographed together with a target, indicated by reference TG, which serves as a standard measurement scale. In FIG. 1, although three targets TG are shown for clarity, only one target TG is used. Respective bracketed references RP1, RP2, RP3 and RP4, appended to the references TG, represent target positions at which the target TG is to be located.

In particular, in the example shown in FIG. 1, the target TG is initially located at the first target position RP1, and the first and second photographing operations are performed at the positions M1 and M2, respectively. After the completion of the second photographing operation, the target TG is moved from the first target position RP1 to the second target position RP2, and the third photographing operation is performed at the position M3. After the completion of the third photographing operation, the target TG is moved from the second target position RP2 to the third target position RP3, and the fourth, fifth, sixth and seventh photographing operations are performed at the positions M4 to M7, respectively. Note, although the third target position RP3 is visually equivalent to the first target position RP1, the target position RP1 and RP3 are distinguished from each other for the photogrammetric measurement. After the completion of the seventh photographing operation, the target TG is further moved from the third target position RP3 to the fourth target position RP4, and the eighth, ninth, tenth and eleventh photographing operations are performed at the positions M8 to M11, respectively.

The target TG is provided with a movement sensor for detecting the movement of the target TG, as disclosed in Unexamined Japanese Patent Publication No. 11-295065, and a tilt-angle sensor for detecting a tilt-angle of the target TG, as disclosed in Unexamined Japanese Patent Publication No. 10-185563. Whenever the target TG is moved from one position to another position, the movement sensor detects a movement of the target between the two positions, and outputs a signal representing the movement of the target TG. The tilt-angle sensor detects a tilt-angle of the target TG to the horizontal plane when being located on the roadway, and outputs a signal representing the detected tilt-angle.

The target TG is further provided with a signal processor for processing the respective signals output from the movement sensor and the tilt-angle sensor, and a radio transmitter for transmitting the processed signals to a receiver provided in the camera. The transmission of the signals from the radio transmitter is repeated at regular short intervals. Whenever a photographing operation is performed by the camera, the transmitted signals are retrieved from the receiver by the control circuit of the camera. The retrieved signals are processed by the control circuit of the camera, and are then stored in the memory card, together with a corresponding frame of image data obtained by the photographing operation.

Figure 2:
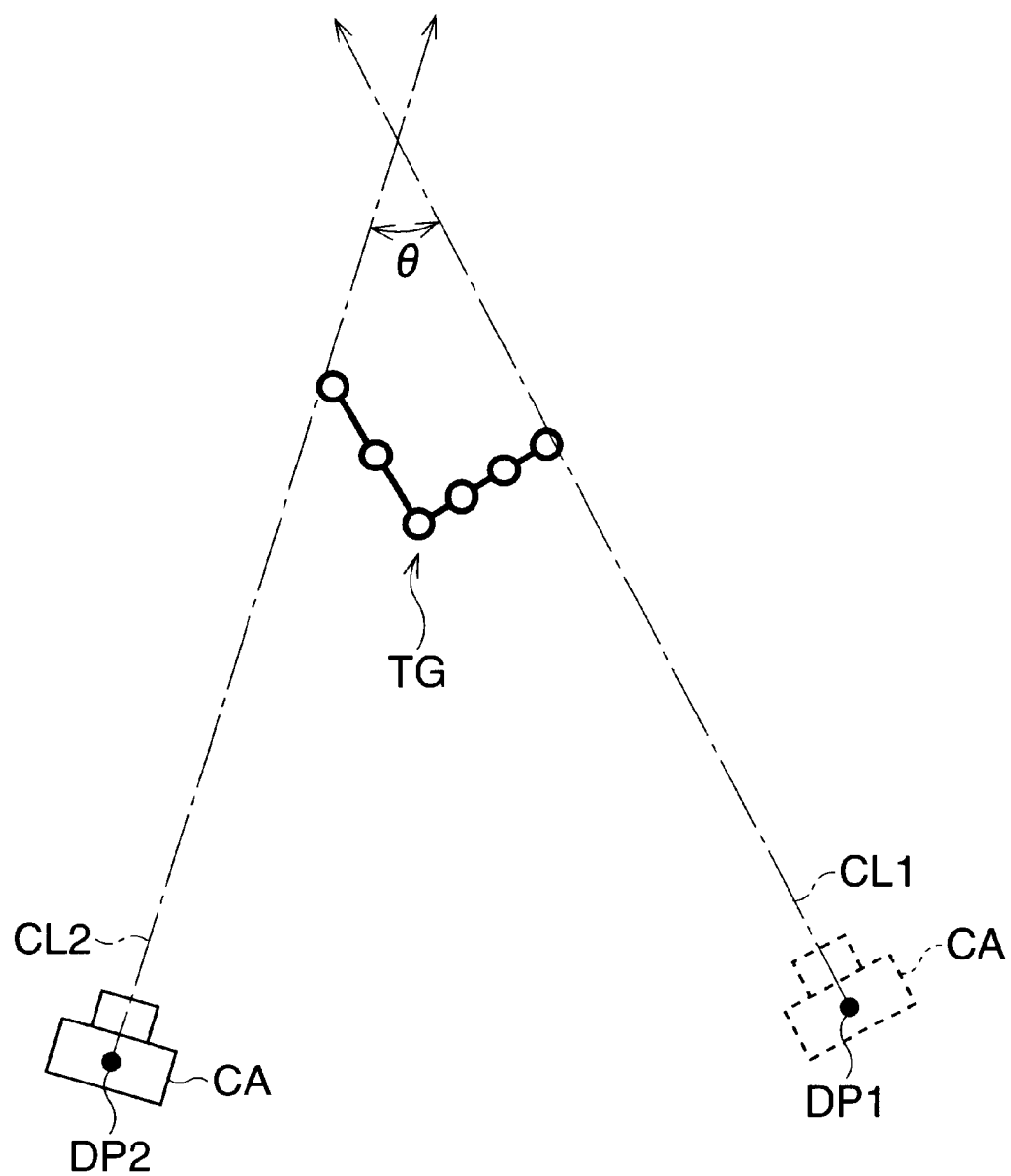
FIG. 2 is a conceptual plan view for explaining how two photographing operations are consecutively performed at different photographing positions in the photogrammetric measurement.

An object to be surveyed is twice photographed by the camera at two different photographing positions and in two different photographing directions. Namely, as shown in FIG. 2 by way of example, two photographing operations are consecutively performed at different photographing positions DP1 and DP2 by the camera with respect to the object to be surveyed (not shown), such that the photographing directions define an angle θ of more than 0° and less than 180°. Of course, as stated above, each photographing operation is performed such that the target TG is photographed. Note, in FIG. 2, the camera is indicated by reference CA, and the respective photographing directions are indicated by references CL1 and CL2. Also, note, in this example, since the photographing operation, performed at the photographing position DP1, is prior to the photographing operation performed at the position DP2, the camera CA is shown by broken lines at the photographing position DP1.

When the two consecutive photographing operations are completed, the respective photographing positions are defined as either right-hand and left-hand photographing positions or left-hand and right-hand photographing positions with respect to the photographed target TG.

As shown in the example of FIG. 2, when the succeeding photographing position DP2 is the position moved clockwise from the preceding photographing position DP1 with respect to the target TG, the respective preceding and succeeding photographing operations DP1 and DP2 are defined as the right-hand and left-hand photographing positions. On the contrary, if the succeeding photographing position DP2 is a position moved counterclockwise from the preceding photographing position DP1 with respect to the target TG, the respective preceding and succeeding photographing positions DP1 and DP2 are defined as the left-hand and right-hand photographing positions.

Figure 3:
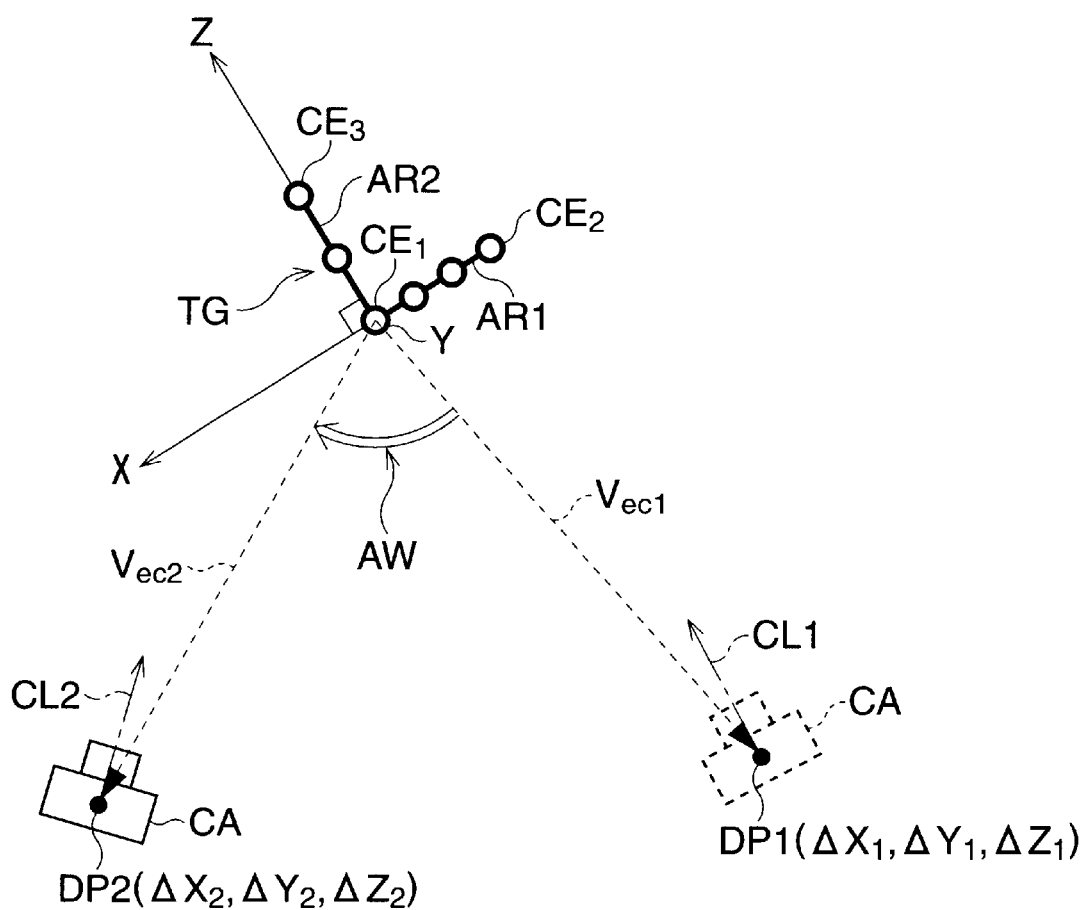
FIG. 3 is a conceptual plan view, similar to FIG. 2, for explaining how the two consecutive photographing positions are defined as left-hand and right-hand photographing positions or right-hand and left-hand photographing positions.

In order to determine whether the respective preceding and succeeding photographing positions DP1 and DP2 are defined as the right-hand and left-hand photographing positions or as the left-hand and right-hand photographing positions with respect to the photographed target TG, an X-Y-Z three dimensional rectangular coordinate system is defined as a right-handed coordinate system on the target TG, as shown in FIG. 3.

In particular, as shown in FIG. 3, the target TG is formed as an L-shaped member including two bar elements AR1 and AR2, which are joined to each other at their ends to form a right angle, and the definition of the X-Y-Z coordinate system is such that the origin thereof is at the corner of the L-shaped member and the respective X- and Z-axes thereof coincide with the longitudinal axes of the bar elements AR1 and AR2, with the Y-axis thereof being perpendicular to the X- and Z-axes.

For the aforesaid determination, first, three-dimensional coordinates $(\Delta X_1, \Delta Y_1, \Delta Z_1)$ and $(\Delta X_2, \Delta Y_2, \Delta Z_2)$ of the positions DP1 and DP2 are calculated with respect to the X-Y-Z coordinate system, and the positions DP1 and DP2 are projected on the X-Z plane. Then, a first vector $V_{ec1}$ is defined so as to be directed from the coordinate origin to the position DP1 projected on the X-Z plane, and a second vector $V_{ec2}$ is defined so as to be directed from the coordinate origin to the position DP2 projected on the X-Z plane. Subsequently, an outer product (vector product) OP of the second vector $V_{ec2}$ to the first vector $V_{ec1}$ is calculated as follows:

$$OP = V_{ec1} \times V_{ec2} = \Delta Z_1 \times \Delta X_2 - \Delta X_1 \times \Delta Z_2$$

In this example, since OP<0, it is found that the position DP2 is a position moved clockwise from the position DP1, as indicated by arrow AW in FIG. 3, because the X-Y-Z three dimensional rectangular coordinate system is defined as the right-handed coordinate system, as stated above.

Thus, when two photographing operations are consecutively performed at different photographing positions by the camera CA with respect to an object to be surveyed, it is possible to easily determine whether the respective photographing positions should be defined as the right-hand and left-hand photographing positions or as the left-hand and right-hand photographing positions with respect to the object to be surveyed.

The X-Y-Z coordinate system is also utilized to produce a survey map on the basis of a pair of photographed pictures, obtained at the photographing positions DP1 and DP2, in accordance with the known manner as disclosed in the aforesaid JPP's No.10-221072 and No.10-293026. Namely, the survey map is produced by projecting three-dimensional coordinates of image points representing an object to be surveyed on a plane (usually the X-Z plane) defined by two of the three axes of the X-Y-Z coordinate system. In this case, the X-Z plane must be horizontal, and both the X-Y and Y-Z planes must be vertical, before the production of the survey map can be properly performed. Nevertheless, the target TG need not necessarily be horizontally positioned on the roadway. Namely, if the target TG is tilted with respect to the horizontal plane, the X-Z plane is also tilted. The tilt of the target TG is corrected on the basis of the tilt-angle data, which is derived from the tilt-angle signal transmitted from the radio transmitter of the target TG. Accordingly, although the target TG is tilted, it is possible to properly perform the definition of the X-Y-Z coordinate system.

As mentioned above, the target TG is used as the standard measurement scale. To this end, the target TG is provided with three main circular plate-like elements $CE_1$, $CE_2$ and $CE_3$ securely attached thereto, which define the respective three main reference points. In particular, each of the main circular plate-like elements $CE_1$, $CE_2$ and $CE_3$ is painted black or covered with a suitable non-reflective black material, and a small white circle area (not shown) is formed at the center of the corresponding circular plate-like element ($CE_1$, $CE_2$, $CE_3$). Thus, when the target TG is photographed, the small white circle areas are conspicuously recorded on the photographed picture, and represent the main reference points on the target TG. The distance between the centers of the elements $CE_1$ and $CE_2$ is equal to that between the centers of the elements $CE_1$ and $CE_3$. Of course, the distance has a predetermined length, and serves as the standard measurement scale. Therefore, accurately scaled distances and lengths can be reproduced on a survey map.

In the example of FIG. 1, while the target TG is located at the first target position RP1, a first pair of pictures is obtained by the consecutive first and second photographing operations at the positions M1 and M2, and features the first target position RP1 of the target TG. As is apparent from FIG. 1, the position M2 is the position moved clockwise from the position M1 with respect to the target TG located at the first target position RP1, and thus the respective positions M1 and M2 are defined as the right-hand and left-hand photographing positions.

While the target TG is located at the second target position RP2, the third photographing operation is only performed once as an additional photographing operation for photographing and recording, for example, evidence or circumstances concerning a traffic accident, unrelated to the photogrammetric measurement. Namely, only one picture is obtained during the third photographing operation at the position M3, and features the second target position RP2 of the target TG. Although this single picture cannot be used for the photogrammetric measurement, it is stored in the memory card of the camera CA.

While the target TG is located at the third target position RP3, a second pair of pictures is obtained by the consecutive fourth and fifth photographing operations at the positions M4 and M5, and a third pair of pictures is obtained by the consecutive sixth and seventh photographing operations at the positions M6 and M7. Of course, the second and third pairs of pictures feature the third target position RP3 of the target TG. As is apparent from FIG. 1, the respective positions M4 and M5 are defined as the right-hand and left-hand photographing positions, and the respective positions M6 and M7 are defined as the left-hand and right-hand photographing positions.

While the target TG is located at the fourth target position RP4, a fourth pair of pictures is obtained by the consecutive eighth and ninth photographing operations at the positions M8 and M9, and a fifth pair of pictures is obtained by the consecutive tenth and eleventh photographing operations at the positions M10 and M11. Of course, the fourth and fifth pairs of pictures feature the fourth target position RP4 of the target TG. As is apparent from FIG. 1, the respective positions M8 and M9 are defined as the left-hand and right-hand photographing positions, and the respective positions M10 and M11 are defined as the right-hand and left-hand photographing positions.

Note, in FIG. 1, references WL indicate white lines painted along the roadway, and references WM indicate white traffic symbols painted on the roadway.

Figure 4:
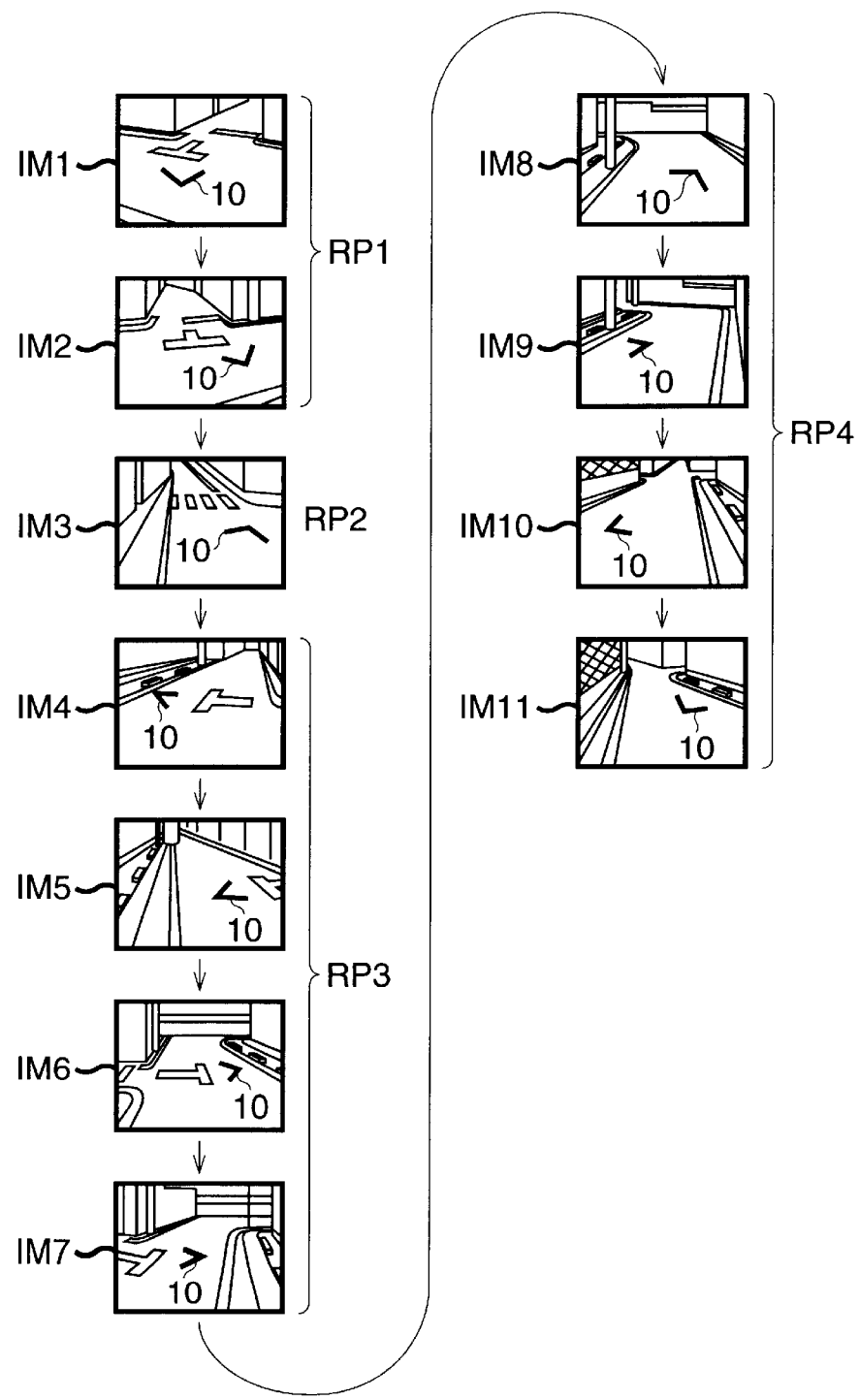
FIG. 4 is a conceptual view showing eleven pictures in a photographing order, which are obtained at eleven photographing positions shown in FIG. 1.

With reference to FIG. 4, the respective pictures, obtained at the positions M1 to M11, are indicated by references IM1 to IM11, and are stored as the eleven frames of image data in the memory card in the order of the photographing operations (M1 to M11). As shown in this drawing, the first and second pictures IM1 and IM2 feature the first target position RP1; the third picture IM3 features the second target position RP2; the fourth, fifth, sixth and seventh pictures IM4 to IM7 feature the third target position RP3; and the eighth, ninth, tenth and eleventh IM8 to IM11 feature the fourth target position RP4.

Note, in each pair of pictures (IM1 and IM2; IM4 and IM5; IM6 and IM7; IM8 and IM9; and IM10 and IM11), a picture (IM1, IM4, IM7, IM9, IM10), obtained at a right-hand photographing position (M1, M4, M7, M9, M10), is referred to as a right-hand picture, and a picture (IM2, IM5, IM6, IM8, IM11), obtained at a left-hand photographing position (M2, M5, M6, M8, M11) is referred to as a left-hand picture, hereinafter.

Figure 5:
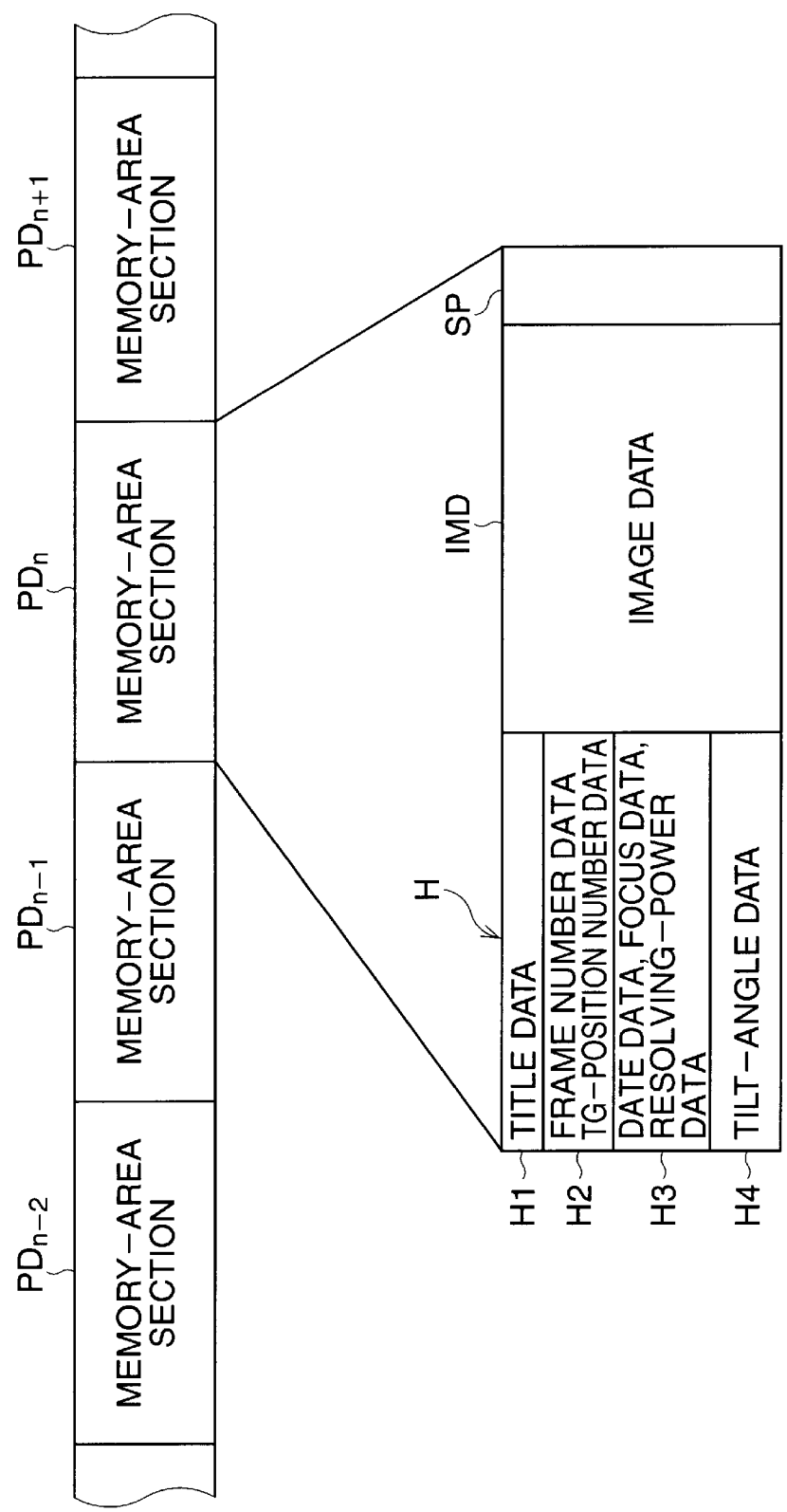
FIG. 5 is a conceptual schematic view showing an example of a format of a memory card, which is detachably held in an electronic digital camera used in the photogrammetric measurement.

FIG. 5 conceptually shows a format of the memory card held in the camera. As shown in this drawing, a memory area of the memory card is sectioned into a plurality of memory-area sections, some of which are indicated by references $PD_{n-2}$, $PD_{n-1}$, $PD_n$ and $PD_{n+1}$, and each of the memory-area sections ( ..., $PD_{n-2}$, $PD_{n-1}$, $PD_n$ and $PD_{n+1}$, ... ) includes an image area IMD, a header area H and a margin area SP. Of course, the image area IMD is provided for storing a frame of image data representing a photographed picture. The header area H is sectioned into subheader areas H1, H2, H3 and H4 for storing various data concerning the photographed picture. The margin area SP is provided for distinguishing between the two adjacent memory-area sections $PD_n$ and $PD_{n+1}$.

The subheader area H1 is provided for storing title data of the photographed picture, and the title data is input by manipulating character-inputting-switch buttons provided on the camera body, if necessary.

The subheader area H2 is provided for storing two kinds of number data: a frame number data representing a photographing order and a target-position number data representing the target-position (RP1, RP2, RP3, RP4) of the target TG.

For the frame number data, a frame number counter is defined in the control circuit of the camera, and, for example, is initially set to "0". Whenever a photographing operation is performed by the camera, the frame number counter is incremented by "1", and is stored as the frame number data in a corresponding subheader area H2. For example, when the first photographing operation is completed at the position M1, the frame number data is stored as "1" in the subheader area H2 of the first memory-area section $PD_1$, and when the eleventh photographing operation is completed at the position M11, the frame number data is stored as "11" in the subheader area H2 of the eleventh memory-area section $PD_{11}$.

For the target-position number data, a target-position-number counter is defined in the control circuit of the camera, and, for example, is initially set to "1". Whenever a movement of the target TG from a position to another position is confirmed by detecting the movement-signal transmitted from the radio transmitter of the target TG, the target-position-number counter is incremented by "1", and, whenever a photographing operation is completed by the camera, a count number data of the target-position-number counter data is stored as the target-position number data in a corresponding subheader area H2.

Thus, when each of the first and second photographing operations is completed, the target-position number data is stored as "1" in the subheader area H2 of each of the memory-area sections $PD_1$ and $PD_2$. Also, when the third photographing operation is completed, the target-position number data is stored as "2" in the subheader area H2 of the memory-area section $PD_3$. Further, when each of the fourth, fifth, sixth and seventh photographing operations is completed, the target-position number data is stored as "3" in the subheader area H2 of each of the memory-area sections $PD_4$, $PD_5$, $PD_6$ and $PD_7$. Similarly, when each of the eighth, ninth, tenth and eleventh photographing operations is completed, the target-position number data is stored as "4" in the subheader area H2 of each of the memory-area sections $PD_8$, $PD_9$, $PD_{10}$ and $PD_{11}$.

The subheader area H3 is provided for storing various photographic data, such as a photographing date, a focus-distance, a resolving-power of a CCD (charge-coupled device) image sensor, used in the camera CA, and so on. These data are automatically stored in the subheader area H3 by the control circuit of the camera whenever a photographing operation is completed.

The subheader area H4 is provided for storing the tilt-angle data of the target TG, which is derived from a tilt-angle signal transmitted from the radio transmitter of the target TG. Namely, whenever a photographing operation is performed by the camera, the tilt-angle signal is retrieved from the receiver by the control circuit of the camera, and the retrieved signal is processed by the control circuit of the camera, thereby producing the tilt-angle data to be stored in the subheader H4.

Figure 6:
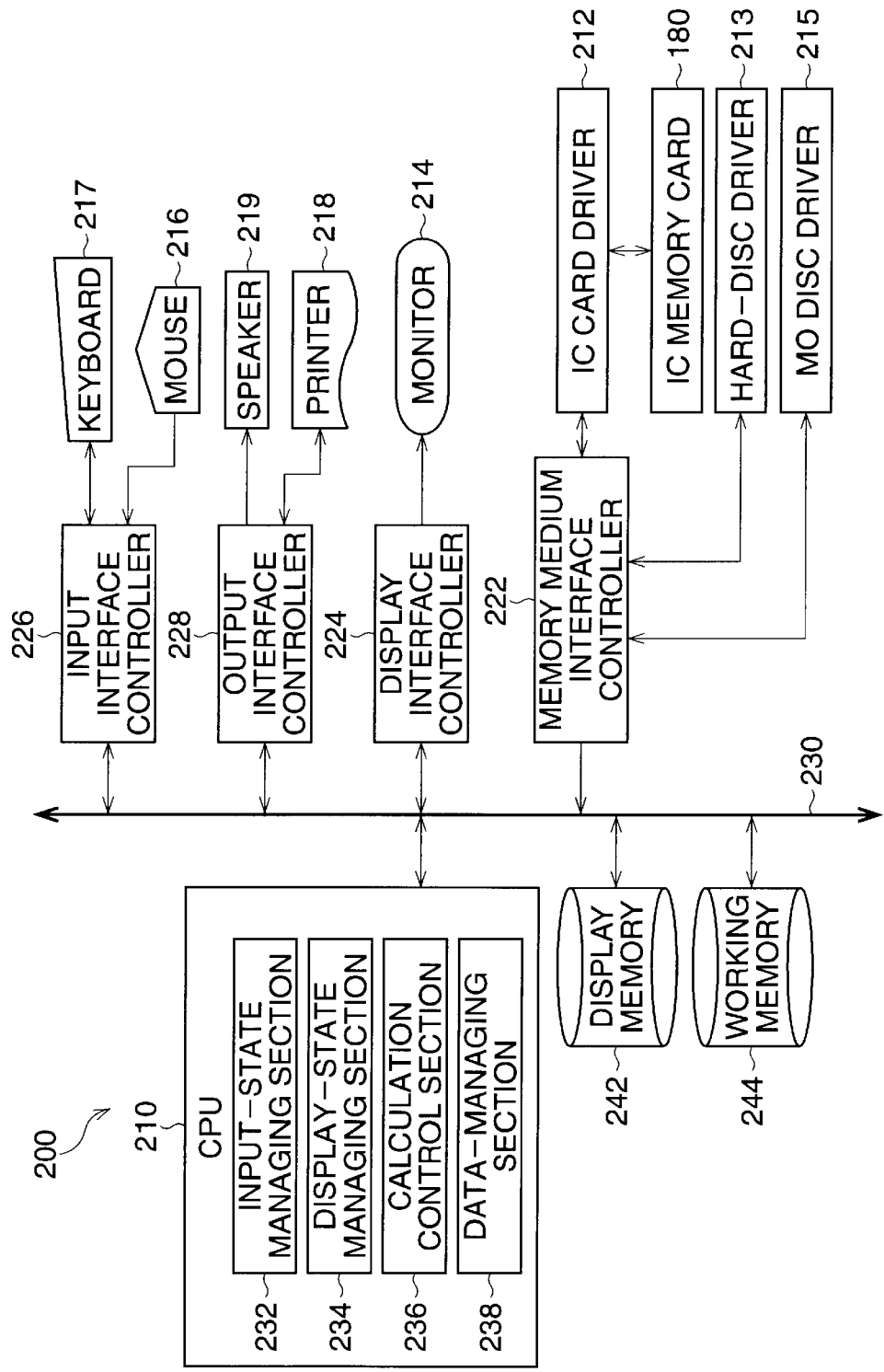
FIG. 6 is a block diagram of the photogrammetric image processing computer system according to the invention.

With reference to FIG. 6, the photogrammetric image processing computer system according to the present invention, generally indicated by reference 200, is shown as a block diagram.

The image processing computer system 200 comprises a central processing unit (CPU) 210; an input interface controller 226 for a mouse 216 and a keyboard 217; an output interface controller 228 for a printer 218 and a speaker 219; a display interface controller 224 for a display device 214, such as a CRT monitor; a memory medium interface controller 222 for an IC memory card driver 212, a hard disc driver 213 and a magneto-optical disc driver 215; a display memory 242 for storing image data on which a scene to be displayed on the monitor 214 is based; and a working memory 244 which may be used as a cache memory when executing calculations and processes in the CPU 210. The input interface controller 226, output interface controller 228, display interface controller 224, memory medium interface controller 222, display memory 242 and working memory 244 are connected to the CPU 210 via a bus 230.

Note, in FIG. 6, reference 180 indicates the IC memory card removed from the aforementioned camera and loaded in the IC memory card driver 212. Also, note, a photogrammetric image-processing program according to the present invention is previously installed in a hard disc of the hard disc driver 213.

Although not shown in FIG. 6, the image processing computer system 200 further comprises a read-only memory (ROM) for storing operating programs and constants, a random-access memory (RAM) for storing temporary data, and so on, and these elements are associated with the CPU 210. Various operations are executed by the CPU 210 in accordance with the operating programs stored in the ROM and the photogrammetric image-processing program installed in the hard disc of the hard disc driver 213, and significant operations, executed by the CPU 210, are visually and conceptually represented by an input-state managing section 232, a display-state managing section 234, a calculation-control section 236, and a data-managing section 238.

The input-state managing section 232 manages various information data and command data input through the mouse 216 and the keyboard 217. For example, when a cursor or pointer is moved on a scene of the monitor 214 by manipulating the mouse 216, the movement of the pointer is managed by the input-state managing section 213. Also, by the input-state managing section 232, it is monitored whether character code data is input through the keyboard 217, and, when the character code data is input, the character code data is converted into character image data, which is output to the display memory 242, whereby character images are displayed on the monitor 214.

The display-state managing section 234 manages a scene to be displayed on the monitor 214. For example, when at least a part of the scene displayed on the monitor 214 is changed, the change of scene is managed by the display-state managing section 234. Namely, writing of image data in the display memory 242 is controlled by the display-state managing section 234, thereby changing the scene displayed on the monitor 214. The display interface controller 224 repeatedly reads the image data from the display memory 242 at regular short time intervals, and converts the read image data into a three primary (red, green and blue) video signal, which are then output to the monitor 214.

The calculation-control section 236 executes various calculations for producing a survey map of the roadway, as stated in detail hereinafter.

The data-managing section 238 manages various data read from the memory card 180 through the IC card driver 212, and various intermediate data obtained by processing the read data.

After the eleven photographing operations are completed by the camera at the photographing positions M1 to M11, as shown in FIG. 1, the memory card 180 is removed from the camera, and is then loaded in the IC card driver 212. Of course, the loaded memory card 180 stores the eleven frames of image data obtained by the eleven photographing operations performed at the positions M1 and M11.

When the image processing computer system 200 is powered ON, an icon, representing the photogrammetric image-processing program according to the present invention, is displayed on the monitor 214. By double-clicking on the icon with the mouse 216, the photogrammetric image-processing program is read by the CPU 210 from the hard disc of the hard disc driver 213, and the scene on the monitor 214 is changed to an initial menu scene for the photogrammetric image-processing program.

FIG. 7A shows, by way of example, a pair-fixing-editing scene, displayed on the monitor 214, which replaces the initial menu scene is changed when the reading of the frames of image data from the memory card 180 is completed.

As shown in FIG. 7A, the pair-fixing-editing scene includes a picture-arranging display area GDA which is provided for displaying plural pairs of pictures (for example, as indicated by references IM1 and IM2; IM4 and IM5; IM6 and IM7; IM8 and IM9; and IM10 and IM11) for producing survey map sections, such that two pictures in each pair are arranged side by side thereon. To this end, the picture-arranging display area GDA is divided into a left-hand display area LDA and a right-hand display area RDA, which are provided for displaying left-hand pictures (IM2, IM5, IM6, IM8, IM11) and right-hand pictures (IM1, IM4, IM7, IM9, IM10), respectively.

Nevertheless, when the reading of the frames of image data (IM1 to IM11) is completed, all the pictures (IM1 to IM11) are provisionally displayed on the left-hand and right-hand display areas IDA and RDA in a manner as explained in detail hereinafter.

The display of each picture on the display area LDA or RDA is performed at a reduced or thumbnail size, and the thumbnail-sized picture will be referred to as an object. In the example shown in FIG. 7A, the ten objects, indicated by references OB1 to OB10, correspond to the pictures IM1 to IM10 obtained at the photographing positions M1 to M10, respectively. Although the remaining object, corresponding to the picture IM11 obtained at the position M11 is not visible, the display of the remaining object is possible by operating a scroll bar SRB with the mouse 216. Of course, the remaining object is to be indicated by reference OB11. Note, image data for the objects OB1 to OB11 are produced from the eleven frames of image data read from the memory card 180, and are stored in the display memory 242.

When the frames of image data are read in order from the memory card 180, two consecutive frames of image data are handled as forming a provisional pair of pictures. Then, it is determined whether respective two pictures in each provisional pair are defined as left-hand and right-hand pictures or as right-hand and left-hand pictures. If the respective two pictures are determined as the left-hand and right-hand pictures, the respective two objects, corresponding to the left-hand and right-hand pictures, are displayed on the left-hand and right-hand display areas LDA and RDA. Also, if the respective two pictures are determined as the right-hand and left-hand pictures, the respective two objects, corresponding to the right-hand and left-hand pictures, are displayed on the right-hand and left-hand display areas RDA and LDA.

In particular, in the example shown in FIG. 4, the pictures IM1 and IM2 form a first provisional pair, and are determined as the right-hand and left-hand pictures, respectively, as stated above. Thus, the respective objects OB1 and OB2, corresponding to the pictures IM1 and IM2, are displayed on the right-hand and left-hand display areas RDA and LDA, as shown in FIG. 7A.

The pictures IM3 and IM4 form a second provisional pair, and it is determined whether the respective pictures IM3 and IM4 are defined as left-hand and right-hand pictures or right-hand and left-hand pictures on the assumption that the photographed targets TG (IM3 and IM4) are located at the same target position. In this case, since the respective pictures IM3 and IM4 are determined as the right-hand and left-hand pictures, the respective objects OB3 and OB4, corresponding to the pictures IM3 and IM4, are displayed on the right-hand and left-hand display areas RDA and LDA, as shown in FIG. 7A.

The pictures IM5 and IM6 form a third provisional pair, and it is determined whether the respective pictures IM5 and IM6 are defined as left-hand and right-hand pictures or right-hand and left-hand pictures. In this case, since the respective pictures IM5 and IM6 are determined as the right-hand and left-hand pictures, the respective objects OB5 and OB6, corresponding to the pictures IM5 and IM6, are displayed on the right-hand and left-hand display areas RDA and LDA, as shown in FIG. 7A.

The pictures IM7 and IM8 form a fourth provisional pair, and it is determined whether the respective pictures IM7 and IM8 are defined as left-hand and right-hand pictures or right-hand and left-hand pictures on the assumption that the photographed targets TG (IM7 and IM8) are located at the same target position. In this case, since the respective pictures IM7 and IM8 are determined as the right-hand and left-hand pictures, the respective objects OB7 and OB8, corresponding to the pictures IM7 and IM8, are displayed on the right-hand and left hand display areas RDA and LDA, as shown in FIG. 7A.

The pictures IM9 and IM10 forms a fifth provisional pair, and it is determined whether the respective pictures IM9 and IM10 are defined as left-hand and right-hand pictures or right-hand and left-hand pictures. In this case, since the respective pictures IM9 and IM10 are determined as the left-hand and right-hand pictures, the respective objects OB9 and OB10, corresponding to the pictures IM9 and IM10, are displayed on the left-hand and right-hand display areas IDA and RDA, as shown in FIG. 7A.

Note, in this embodiment, whenever odd frames of image data are read from the memory card 180, the last picture or object (OB11) is provisionally displayed on the left-hand display area LDA.

As is apparent from FIG. 7A, although the first provisional pair of objects OB1 and OB2 forms a proper pair for producing a survey map, the remaining provisional pairs of objects OB3 and OB4; OB5 and OB6; OB7 and OB8; and OB9 and OB10 are improper due to the intervention of the additional photographing operation (M3).

There is a way of immediately determining whether two objects displayed side by side on the display areas IDA and RDA form a proper pair for producing a survey map section. Namely, if the two objects concerned are based on the different target positions of the target TG, they cannot form the proper pair for producing the survey map section. Of course, it is possible to easily determine whether the two objects displayed side by side on the display areas LDA and RDA form a proper pair for producing a survey map section, using the target-position number data, representing the target-position (RP1, RP2, RP3, RP4) of the target TG, read from the subheaders H2 of the corresponding memory-area sections of the memory card 180.

In this embodiment, as shown in FIG. 7A by way of example, a pair of objects (OB3 and OB4; OB7 and OB8), based on the different target position, is encompassed by a displayed broken line frame TDL, whereby an operator can immediately recognize that the two objects do not form a proper pair for producing a survey map section.

The objects (OB1 to OB11) displayed on the display area GDA (LDA and RDA) are rearranged such that the proper pairs of objects (OB1 and OB2; OB4 and OB5; OB6 and OB7; OB8 and OB9; and OB10 and OB11) are obtained and displayed on the display area GDA (LDA and RDA). For the rearrangement of objects (OB1 to OB11), the pair-fixing-editing scene includes a picture-shunting display area TMPA, to which an object is temporarily shunted or transferred from the picture-arranging display area GDA (RDA and LDA), and three object-transfer buttons MB1, MB2 and MB3 displayed between the display areas GDA (LDA and RDA) and TMPA.

In the example shown in FIG. 7A, by transferring the additional object OB3 from the display area RDA to the display area TMPA, it is possible to rearrange the remaining ten objects OB1, OB2, OB4, OB5, OB6, OB7, OB8, OB9, OB10 and OB11 such that the five proper pairs of objects (OB1 and OB2; OB4 and OB5; OB6 and OB7; OB8 and OB9; and OB10 and OB11) are obtained.

In particular, before the additional object OB3 can be transferred from the display area RDA to the display area TMPA, first, the additional object OB3 must be indicated by clicking on it with the mouse 216, to reverse the additional object OB3 to a negative object image, whereby the additional object OB3 can be visually distinguished from the other objects. Then, when the first object-transfer button MB1 is operated by clicking on it with the mouse 216, the additional object OB3 is shunted or transferred from the display area RDA to the display area TMPA, as shown in FIG. 7B.

As soon as the additional OB3 is shunted or transferred to the display area TMPA, the objects OB4 to OB11 are shifted so that four new proper pairs of objects OB4 and OB5; OB6 and OB7; OB8 and OB9; and OB10 and OB11 are formed. Then, it is determined whether the respective two objects in each new pair are defined as left-hand and right-hand pictures or as right-hand and left-hand pictures. Thus, as shown in FIG. 7B, the respective objects OB4 and OB5 are displayed on the right-hand and left-hand display areas RDA and LDA; the respective objects OB6 and OB7 are displayed on the left-hand and right-hand display areas LDA and RDA; the respective objects OB8 and OB9 are displayed on the left-hand and right-hand display areas LDA and RDA; and the respective objects OB10 and OB11 are displayed on the right-hand and left-hand display areas RDA and LDA.

As stated above, in general, an object to be surveyed is twice photographed by the camera from two different photographing positions and in two different photographing directions. However, there may be a case where three photographing operations are carefully performed with respect to an object to be surveyed. In this case, two pictures are selected from among the three pictures obtained by the three photographing operations to determine a best pair for producing a survey map section. The first object-transfer button MB1 is also used for the selection of two pictures or objects from among the three pictures or objects. Namely, one of the three pictures or objects is selected and transferred from the display area GDA (RDA and LDA) to the display area TMPA, using the first object-transfer button MB1, whereby the best pair of pictures or objects for producing the survey map section is left in the display areas RDA and LDA.

Although it is preferable to orderly perform a series of photographing operations for the photogrammetric measurement, as explained with reference to FIG. 1, in reality, photographing operations may be disorderedly performed for various reasons. In this case, it is necessary to thoroughly rearrange objects disorderedly displayed on the picture-arranging display area GDA (RDA and IDA), before proper pairs of objects for producing survey map sections can be obtained. It is possible to advantageously utilize the second and third object-transfer buttons MB2 and MB3 for the thorough rearrangement of the objects.

For example, the second object-transfer button MB2 is provided for moving an object from a displayed position thereof to another position on the picture-arranging display area GDA. In particular, first, an object to be moved is transferred to the display area TMPA, using the first object-transfer button MB1. Then, an object, displayed on either the display area LDA or RDA at a location at which the object concerned is to be moved, is indicated by clicking on it with the mouse 216. Thereafter, when the second object-transfer button MB2 is operated by clicking on it with the mouse 216, the movement of the object concerned from the display area TMPA to either the display area RDA or LDA is performed such that the object concerned is displayed at the location at which the indicated object is displayed on either the display area LDA or RDA.

Whenever an object is transferred from either the display area LDA or RDA to the display area TMPA, or whenever an object is returned from the display area TMPA to either display area LDA or RAD, the objects displayed on the display area GDA (LDA and RDA) shifted up or down so that new pairs of objects are formed. Then, it is again determined whether the respective two objects in each new pair are defined as left-hand and right-hand pictures or as right-hand and left-hand pictures.

Also, after an object, displayed on the display area TMPA, is indicated by clicking on it with the mouse 216, when the third object-transfer button MB3 is operated by clicking on it with the mouse 216, the indicated object is returned to the display area GDA, and is then displayed at the end location of the column of the objects displayed on either the display area LDA or RDA. Namely, when the objects are rearranged on the display area GDA (LDA and RDA), objects having no relation to the rearrangement of objects can be successively moved to an end location of the column of the objects displayed on either the display area LDA or RDA, thereby facilitating the rearrangement of objects.

Thus, using the second and third object-transfer buttons MB2 and MB3, it is possible to advantageously and effectively perform the correct rearrangement of objects.

Note, whenever an object displayed on either the picture-arranging display area GDA (LDA and RDA) or the picture-shunting display area TMPA is indicated by clicking on it with the mouse 216, the indicated object is displayed as a negative image. Also, just after an object is transferred between the display areas GDA and TMPA, the transferred object is displayed as a negative image.

As shown in FIGS. 7A and 7B, the pair-fixing-editing scene further includes a message display area MDA which is utilized to display various messages to guide the operator while various processes are executed while rearranging the objects.

Furthermore, a completion button CIB and a cancel button CSB are displayed adjacent to the message display area MDA on the pair-fixing-editing scene of the monitor 214.

After the rearrangement of objects is completed to obtain proper pairs of objects displayed side by side on the display areas LDA and RDA, as shown in FIG. 7B, when the completion button CIB is operated by clicking on it with the mouse 216, each proper pair of objects is fixed as forming a pair for producing a survey map section, and all the proper pairs of objects or pictures (IM1 and IM2; IM4 and IM5; IM6 and IM7; IM8 and IM9; and IM10 and IM11) are stored in the working memory 244.

During the rearrangement of objects, an object may be erroneously indicated on either the display area GDA (LDA and RDA) or TMPA by clicking on it with the mouse 216. In this case, it is possible to cancel the erroneous indication of the object by operating the cancel button CSB by clicking on it with the mouse 216.

To manage the display of the objects (OB1 to OB11) on the picture-arranging display area GDA (RDA and LDA) and the picture-shunting display area TMPA, a display list table is defined in the working memory 244. With reference to FIG. 8A, the display list table is conceptually shown by way of example.

The display list table includes a Use/List for managing objects to be displayed on the picture-arranging display area GDA, an Unuse/List for managing objects to be displayed on the picture-shunting display area TMPA, and a Thumbnail/List for managing whether respective two objects in a pair should be displayed on the left-hand and right-hand display areas LDA and RDA or the right-hand and left-hand display areas RDA and LDA. As shown in FIG. 8A, the Use/List has two sections respectively headed by a "Use/List Number" and a "Picture Name"; the Unuse/List has respective two sections headed by an "Unuse/list Number" and a "Picture Name"; and the Thumbnail/List has two sections respectively headed by a "Thumbnail/List Number" and a "Use/List Number".

For example, after the eleven frames of image data are read from the memory card 180, numbers 1 to 11 are written in the "Use/List Number" section of the Use/List, and eleven picture names are correspondingly written in the "Picture Name" section thereof. Note, in FIG. 8A, for the sake of convenience, references IM1 (OB1) to IM11 (OB11) per se are used as the picture names.

FIG. 8B shows the display list table after it is determined whether the respective two pictures in each provisional pair are defined as the left-hand and right-hand pictures or the right-hand and left-hand pictures.

In particular, when the respective pictures IM1 and IM2 in the first provisional pair are determined as the right-hand and left-hand pictures, numbers 1 and 2 are written in the "Thumbnail/List Number" section of the Thumbnail/List, and the use/list numbers 2 and 1, representing the respective left-hand and right-hand pictures IM2 and IM1, are correspondingly written in the "Use/List Number" section of the Thumbnail/List.

When the respective pictures IM3 and IM4 in the second provisional pair are determined as the right-hand and left-hand pictures, numbers 3 and 4 are written in the "Thumbnail/List Number" section of the Thumbnail/List, and the use/list numbers 4 and 3, representing the respective left-hand and right-hand pictures IM4 and IM3, are correspondingly written in the "Use/List Number" section of the Thumbnail/List.

When the respective pictures IM5 and IM6 in the third provisional pair are determined as the right-hand and left-hand pictures, numbers 5 and 6 are written in the "Thumbnail/List Number" section of the Thumbnail/List, and the use/list numbers 6 and 5, representing the respective left-hand and right-hand pictures IM6 and IM5, are correspondingly written in the "Use/List Number" section of the Thumbnail/List.

When the respective pictures IM7 and IM8 in the fourth provisional pair are determined as the right-hand and left-hand pictures, numbers 7 and 8 are written in the "Thumbnail/List Number" section of the Thumbnail/List, and the use/list numbers 8 and 7, representing the respective left-hand and right-hand pictures IM8 and IM7, are correspondingly written in the "Use/List Number" section of the Thumbnail/List.

When the respective pictures IM9 and IM10 in the fifth provisional pair are determined as the left-hand and right-hand pictures, numbers 9 and 10 are written in the "Thumbnail/List Number" section of the Thumbnail/List, and the use/list numbers 9 and 10, representing the respective left-hand and right-hand pictures IM9 and IM10, are correspondingly written in the "Use/List Number" section of the Thumbnail/List.

Note, as shown in FIG. 8B, a number 11 is written in the "Thumbnail/List Number" section of the Thumbnail/List for the last single picture IM11, and the use/list number 11, representing the picture IM11, is correspondingly written in the "Use/List Number" section of Thumbnail/List.

Thus, the display of the ten objects OB1 to OB10 on the picture-arranging display area GDA (LDA and RDA) is performed as shown in FIG. 7A. Namely, the odd thumbnail/list numbers 1, 3, 5, 7, 9 and 11 represent the respective display locations on the left-hand display area LDA, at which the objects OB2, OB4, OB6, OB8 and OB9 are displayed, and the even thumbnail/list numbers 2, 4, 6, 8 and 10 represent the respective display locations on the right-hand display area RDA, at which the objects OB1, OB3, OB5, OB7 and OB10 are displayed. Of course, as mentioned above, by operating the scroll bar SRB, it is possible to display the object OB11 on the left-hand display area LDA at a display location, represented by the thumbnail/list number 11, following the display location of the object OB9.

When the object OB3 is shunted or transferred from the right-hand display area RDA to the picture-shunting display area TMPA (FIG. 7B), the picture name "IM3" is eliminated from the "Picture Name" section of the Use/List, and the picture names "IM4" to "IM1" are moved up so as to be renumbered by the use/list numbers 3 to 10, respectively, as shown in FIG. 8C. On the other hand, a number 1 is written in the "Unuse/List Number" section of the Unuse/List, and the picture name "IM3" is correspondingly written in the "Picture Name" section of the Unuse/List, whereby the object OB3 is displayed on the picture-shunting display area TMPA.

Due to the elimination of the picture name "IM3", five new pairs of pictures IM1 and IM2; IM4 and IM5; IM6 and IM7; IM8 and IM9; and IM10 and IM11 are produced, and it is determined whether the respective two pictures in each new pair are defined as left-hand and right-hand pictures or right-hand and left-hand pictures, so that the Thumb/nail List is rewritten as shown in FIG. 8D.

In particular, since the respective pictures IM1 and IM2 in the first new pair are determined as the right-hand and left-hand pictures, numbers 1 and 2 are written in the "Thumbnail/List Number" section of the Thumbnail/List, and the use/list numbers 2 and 1, representing the respective left-hand and right-hand pictures IM2 and IM1, are correspondingly written in the "Use/List Number" section of the Thumbnail/List.

Similarly, since the respective pictures IM4 and IM5 in the second new pair are determined as the right-hand and left-hand pictures, numbers 3 and 4 are written in the "Thumbnail/List Number" section of the Thumbnail/List, and the Use/list numbers 4 and 3, representing the respective left-hand and right-hand pictures IM5 and IM4, are correspondingly written in the "Use/List Number" section of the Thumbnail/List, as shown in FIG. 8D.

Also, since the respective pictures IM6 and IM7 in the third new pair are determined as the left-hand and right-hand pictures, numbers 5 and 6 are written in the "Thumbnail/List Number" section of the Thumbnail/List, and the Use/list numbers 5 and 6, representing the respective left-hand and right-hand pictures IM6 and IM7, are correspondingly written in the "Use/List Number" section of the Thumbnail/List, as shown in FIG. 8D.

Similarly, since the respective pictures IM8 and IM9 in the fourth new pair are determined as the left-hand and right-hand pictures, numbers 7 and 8 are written in the "Thumbnail/List Number" section of the Thumbnail/List, and the Use/list numbers 7 and 8, representing the respective left-hand and right-hand pictures IM8 and IM9, are correspondingly written in the "Use/List Number" section of the Thumbnail/List, as shown in FIG. 8D.

Also, since the respective pictures M10 and IM11 in the fifth new pair are determined as the right-hand and left-hand pictures, numbers 9 and 10 are written in the "Thumbnail/List Number" section of the Thumbnail/List, and the Use/list numbers 10 and 9, representing the respective left-hand and right-hand pictures IM11 and IM10, are correspondingly written in the "Use/List Number" section of the Thumbnail/List, as shown in FIG. 8D.

In short, whenever an object is transferred between the display areas GDA (LDA and RDA) and TMPA, the display list table (FIGS. 8A to 8D) is written to manage the display of the objects (OB1 to OB11) on the display areas GDA (RDA and LDA) and TMPA.

FIG. 9 shows a flowchart of a main routine executed by the photogrammetric image-processing system 200. Note, the execution of the main routine is started with an instruction to read image data from the memory card 180 by clicking on the initial menu scene of the monitor 214, using the mouse 216.

At step S901, the frames of image data (IM1, IM2, ..., IM10 and IM1) are read together with various header data from the memory-area sections ($PD_1$, $PD_2$, ..., $PD_{10}$ and $PD_{11}$) of the memory card 180, and are temporarily stored in the working memory 244. Note, if necessary, all the data may be cleared from the memory card 180 as soon as the reading of the image data from the memory card 180 is completed.

At step S902, a variable $j_{max}$ is set to a total number of the read frames of image data, and a loop counter j is set to "1". Of course, in this example, since the total number of the read frames of image data is "11", $j_{max}=11$.

At step S903, three-dimensional coordinates of each photographing position Mj (j=1, 2, ..., 10 and 11) is calculated with respect to an X-Y-Z three-dimensional rectangular coordinate system defined on the photographed target TG. At step S904, it is determined whether a count number of the loop counter j has reached the set value (11) of the variable $j_{max}$. If $j<j_{max}$, the control proceeds to step S905, in which the counter j is incremented by "1", and then the control returns to step S903. Namely, the routine comprising steps 903, 904 and 905 is repeatedly executed until the calculation of all the three-dimensional coordinates of the photographing positions (M1, M2, ..., M10 and M11) are completed.

Of course, in this example, for the calculation of the three-dimensional coordinates of the positions M1 and M2, the X-Y-Z coordinate system is defined on the target TG located at the first target position RP1; for the calculation of the three-dimensional coordinates of the position M3, the X-Y-Z coordinate system is defined on the target TG located at the second target position RP2; for the calculation of the three-dimensional coordinates of the positions M4, M5, M6 and M7, the X-Y-Z coordinate system is defined on the target TG located at the third target position RP3; and for the calculation of the three-dimensional coordinates of the positions M8, M9, M10 and M11, the X-Y-Z coordinate system is defined on the target TG located at the fourth target position RP4.

At step S1000, a pair-fixing-editing routine is executed as a subroutine to allocate pictures in pairs for producing survey map sections from among the pictures (IM1, IM2, ..., IM10 and IM11). Note, the pair-fixing-editing routine is explained in detail hereinafter with reference to FIG. 10.

After the pair-fixing-editing routine is completed, the control proceeds to step S906, in which a survey-map-production routine is executed in a known manner, thereby producing a survey map section on the basis of a fixed pair of pictures obtained by the execution of the pair-fixing-editing routine.

When the production of the survey map section is completed or when the production of the survey map section is suspended, the control proceeds to step S907, in which various data which includes the image data, map data, etc. are stored in the hard disc of the hard disc driver 213. Of course, the various data may be stored in an optical disc of the magneto-optical disc driver 215, if necessary.

Figure 10:
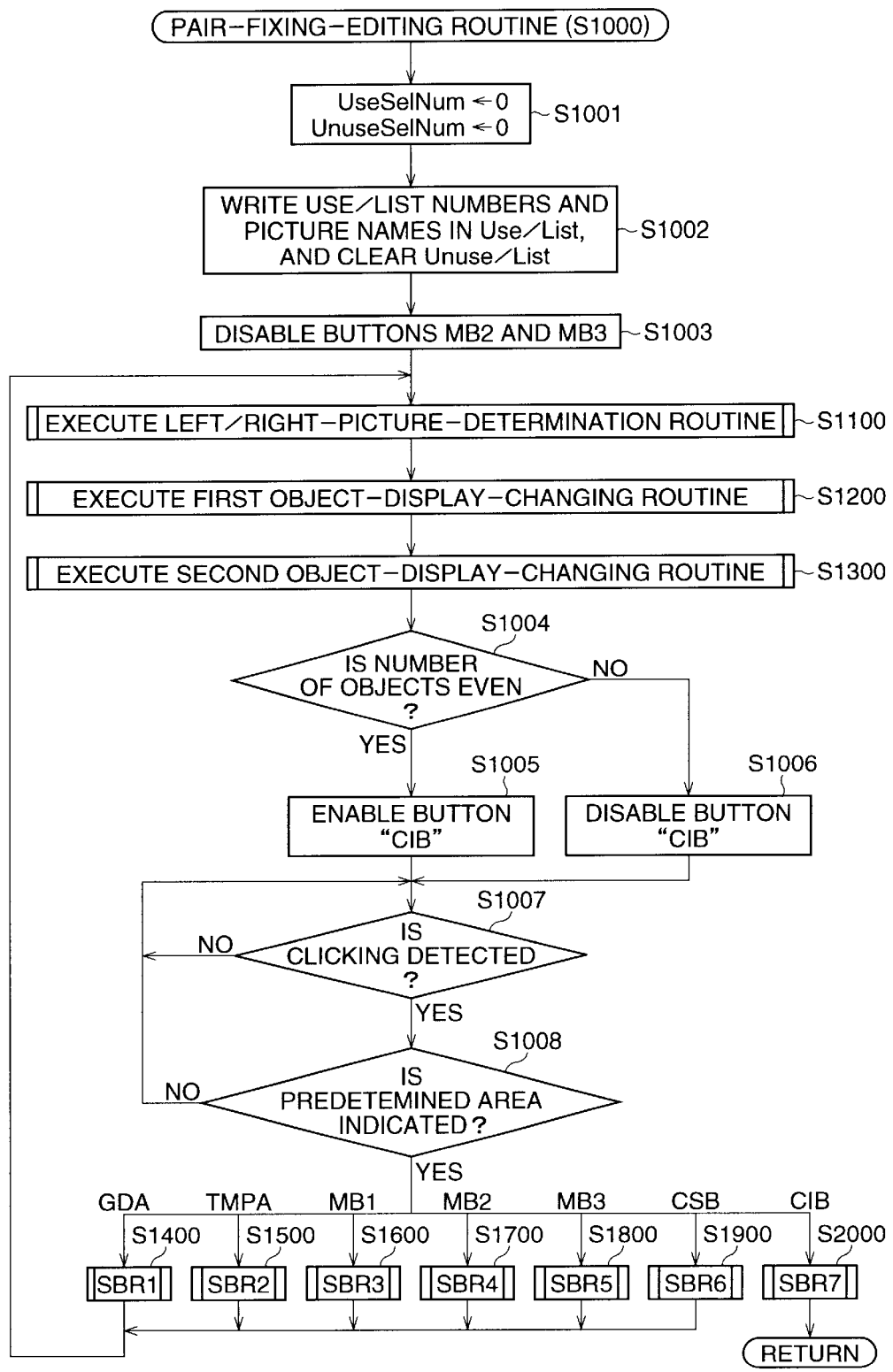
FIG. 10 is a flowchart of a pair-fixing-editing routine executed as a subroutine in the main routine of FIG. 9.

FIG. 10 shows a flowchart of the pair-fixing-editing routine executed in step S1000 of the main routine shown in FIG. 9. Note, when the pair-fixing-editing routine is executed, the initial menu scene on the monitor 214 is changed to the pair-fixing-editing scene as shown in FIG. 7A.

At step S1001, variables "UseSelNum" and "UnuseSelNum" are reset to "0".

The variable "UseSelNum" is used to represent whether an object is indicated on the picture-arranging-display area GDA (LDA and RDA) by clicking on it with the mouse 216. When the indication of an object on the display area GDA is confirmed, the variable "UseSelNum" is set to a use/list number corresponding to a thumbnail/list number representing the indicated object. For example, when the additional object OB3 is indicated on the right-hand display area RDA (FIG. 7A) by clicking on it with the mouse 216, the variable "UseSelNum" is made to be "3", which is the use/list number corresponding to the thumbnail/list number 4 representing the indicated object OB3.

The variable "UnuseSelNum" is used to represent whether an object is indicated on the picture-shunting-display area TMPA by clicking on it with the mouse 216. When the indication of an object on the display area TMPA is confirmed, the variable "UnuseSelNum" is made to be an unuse/list number representing the indicated object. For example, the additional object OB3 is indicated on the display area TMPA by clicking on it with the mouse 216, the variable "UnuseSelNum" is made to be "1", which is the unuse/list number representing the additional object OB3.

At step S1002, use/list numbers (1 to 11) and picture names ("IM1" to "IM11") are correspondingly written in the Use/List, and the Unuse/List is cleared. Of course, two consecutive pictures provisionally form a pair, as stated above.

At step S1003, the second and third object-transfer buttons MB2 and MB3 are disabled, because as the Unuse/List is cleared there is no object on the display area TMPA. Each of the disabled buttons MB2 and MB3 is displayed at a lower displaying-density on the pair-fixing-editing scene of the monitor 214, whereby it can be visually recognized by the operator whether each of the buttons MB2 and MB3 is disabled or enabled.

At step S1100, a left/right-picture-determination routine is executed as a subroutine to determine whether respective two pictures in each pair are defined as left-hand and right-hand pictures or right-hand and left-hand pictures. Note, the left/right-picture-determination routine is explained in detail hereinafter with reference to FIG. 11.

At step S1200, a first object-display-changing routine is executed as a subroutine to change the scene of the picture-arranging display area GDA (LDA and RDA). Note, the first object-display-changing routine is explained in detail hereinafter with reference to FIG. 12.

At step S1300, a second object-display-changing routine is executed as a subroutine to change the scene of the picture-shunting display area TMPA. Note, the second object-display-changing routine is explained in detail hereinafter with reference to FIG. 13.

At step S1004, it is determined whether the number of objects displayed on the display area GDA is even. If the number of objects is even, the control proceeds to step S1005, in which the completion button CIB is enabled. The enabled button CIB is displayed at a higher displaying-density on the pair-fixing-editing scene of the monitor 214, whereby it can be visually recognized by the operator that the completion button CIB is enabled.

On the other hand, at step S1004, if the number of the objects is odd, the control proceeds from step S1004 to step S1006, in which the completion button CIB is disabled. Note, the odd number of objects, displayed on the picture-arranging display area GDA, means that pair-fixing editing has not been completed. The disabled button CIB is displayed at a lower displaying-density on the pair-fixing-editing scene of the monitor 214, whereby it can be visually recognized by the operator that the button CIB is disabled.

In either case, at step S1007, it is monitored at suitable regular short time intervals whether a clicking operation is performed with the mouse 216. When the clicking operation is confirmed, the control proceeds to step S1008, in which it is determined whether a predetermined area is indicated by the pointer (not shown in FIGS. 7A and 7B) during the clicking operation. When the predetermined area is not indicated by the pointer during the clicking operation, the control returns to step S1007.

At step S1008, when the predetermined area indicated by the pointer is the picture-arranging display area GDA, the control proceeds to step S1400, in which a subroutine SBR1 is executed. Note, the subroutine SBR1 is explained in detail hereinafter with reference to FIG. 14.

At step S1008, when the predetermined area indicated by the pointer is the picture-shunting display area TMPA, the control proceeds to step S1500, in which a subroutine SBR2 is executed. Note, the subroutine SBR2 is explained in detail hereinafter with reference to FIG. 15.

At step S1008, when the predetermined area indicated by the pointer is the first object-transfer button MB1, the control proceeds to step S1600, in which a subroutine SBR3 is executed. Note, the subroutine SBR3 is explained in detail hereinafter with reference to FIG. 16.

At step S1008, when the predetermined area indicated by the pointer is the second object-transfer button MB2, the control proceeds to step S1700, in which a subroutine SBR4 is executed. Note, the subroutine SBR4 is explained in detail hereinafter with reference to FIG. 17.

At step S1008, when the predetermined area indicated by the pointer is the third object-transfer button MB3, the control proceeds to step S1800, in which a subroutine SBR5 is executed. Note, the subroutine SBR5 is explained in detail hereinafter with reference to FIG. 18.

At step S1008, when the predetermined area indicated by the pointer is the cancel button CSB, the control proceeds to step S1900, in which a subroutine SBR6 is executed. Note, the subroutine SBR6 is explained in detail hereinafter with reference to FIG. 19.

At step S1008, when the predetermined area indicated by the pointer is the completion button CIB, the control proceeds to step S2000, in which a subroutine SBR7 is executed. Note, the subroutine SBR7 is explained in detail hereinafter with reference to FIG. 20.

Figure 11:
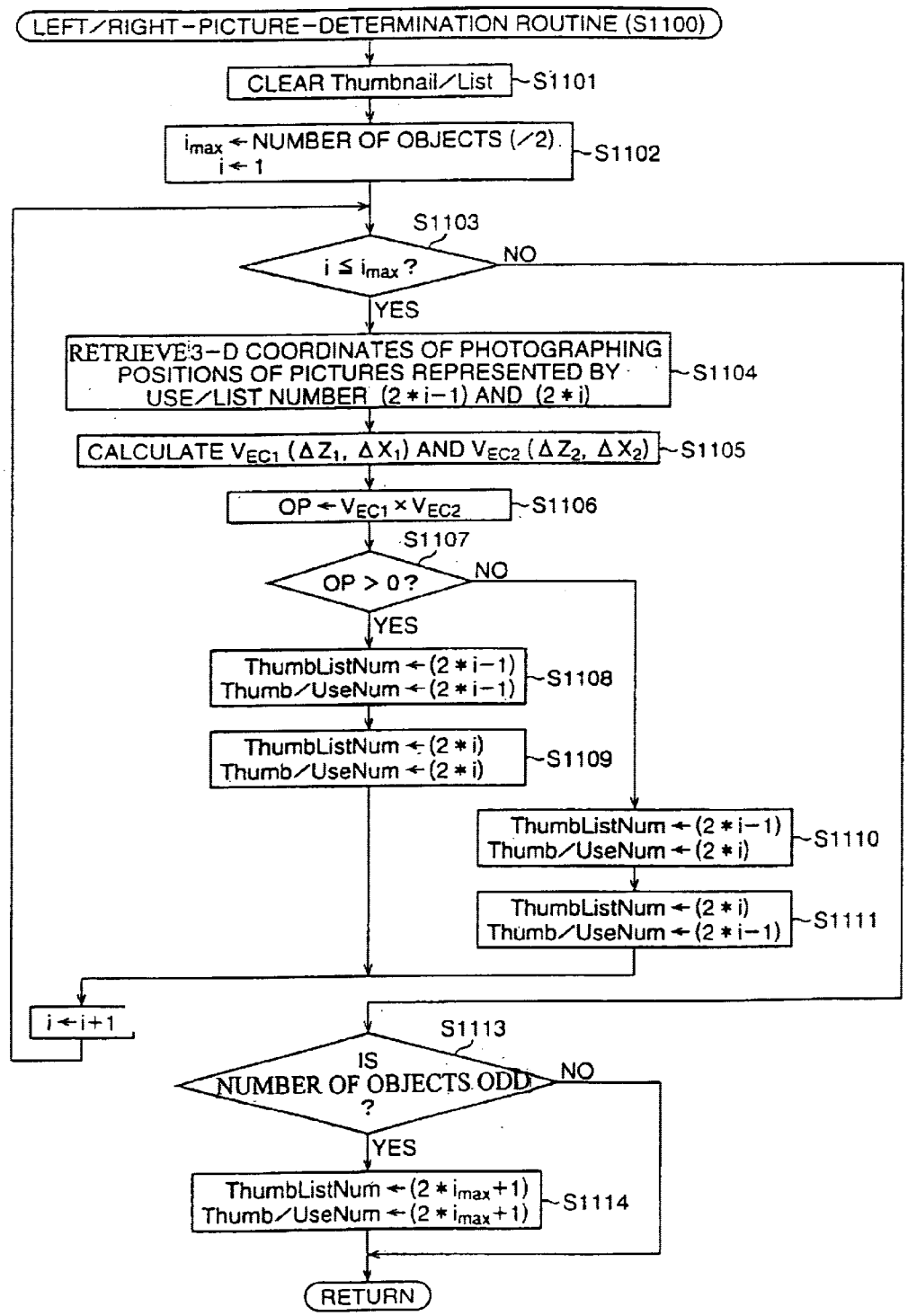
FIG. 11 is a flowchart of a left/right-picture-determination routine executed as a subroutine in the pair-fixing-editing routine of FIG. 10.

FIG. 11 shows a flowchart of the left/right-picture-determination routine executed in step S1100 of the pair-fixing-editing routine shown in FIG. 10.

At step S1101, the Thumbnail/List is cleared, as shown in FIG. 8A. Then, at step S1102, a variable $i_{max}$ is set to a quotient obtained when dividing a total number of the objects, listed in the Use/List, by two, and a loop counter i is set to "1". Of course, in the example, a setting of "5" is given the variable $i_{max}$.

At step S1103, it is determined whether a count number of the loop counter i has reached the set value (5) of the variable $i_{max}$. If $i \leq i_{max}$, the control proceeds to step S1104, in which a set of three-dimensional coordinates $(\Delta X_1, \Delta Y_1, \Delta Z_1)$ and $(\Delta X_2, \Delta Y_2, \Delta Z_2)$ of the photographing positions of the pictures, represented by use/list numbers $(2^*i-1)$ and $(2^*i)$, is retrieved by the CPU 210 from the working memory 244.

At step S1105, a set of vectors $V_{ec1}$ $(\Delta X_1, \Delta Z_1)$ and $V_{ec2}$ $(\Delta X_2, \Delta Z_2)$ is defined on the basis of the retrieved three-dimensional coordinates $(\Delta X_1, \Delta Y_1, \Delta Z_1)$ and $(\Delta X_2, \Delta Y_2, \Delta Z_2)$, as explained with reference to FIG. 3. Then, at step S1106, an outer product (vector product) OP of the vector $V_{ec1}$ to the vector $V_{ec2}$ is calculated as follows:

$$OP = V_{ec1} \times V_{ec2} = \Delta Z_1 \times \Delta X_2 - \Delta X_1 \times \Delta Z_2$$

At step S1107, it is determined whether the outer product OP is positive or negative, i.e. whether the respective photographing positions, represented by the vectors $V_{ec1}$ $(\Delta X_1, \Delta Z_1)$ and $V_{ec2}$ $(\Delta X_2, \Delta Z_2)$, are defined as left-hand and right-hand photographing positions or right-hand and left-hand photographing positions.

If OP>0, i.e. if the respective photographing positions, represented by the vectors $V_{ec1}$ $(\Delta X_1, \Delta Z_1)$ and $V_{ec2}$ $(\Delta X_2, \Delta Z_2)$, are defined as the left-hand and right-hand photographing positions, the control proceeds to step S1108, in which respective variables "ThumbListNum" and "Thumb/UseNum" are set to $(2^*i-1)$ and $(2^*i-1)$, whereby the numbers $(2^*i-1)$ and $(2^*i-1)$ are correspondingly written in the respective "Thumbnail/List Number" section and "Use/List Number" section of the Thumbnail/List. Then, at step S1109, the respective variables "ThumbListNum" and "Thumb/UseNum" are set to $(2^*i)$ and $(2^*i)$, whereby the numbers $(2^*i)$ and $(2^*i)$ are correspondingly written in the respective "Thumbnail/List Number" section and "Use/List Number" section of the Thumbnail/List.

Note, of course, the respective variables "ThumbListNum" and "Thumb/UseNum" are utilized to write a thumbnail/list number and a use/list number in the "Thumbnail/List Number" section and "Use/List Number" section of the Thumbnail/List (FIG. 8B or 8D).

At step S1107, if OP<0, i.e. if the respective photographing positions, represented by the vectors $V_{ec1}$ $(\Delta X_1, \Delta Z_1)$ and $V_{ec2}$ $(\Delta X_2, \Delta Z_2)$, are defined as the right-hand and left-hand photographing positions, the control proceeds from step S1107 to step S1110, in which the respective variables "ThumbListNum" and "Thumb/UseNum" are set to $(2^*i-1)$ and $(2^*i)$, whereby the numbers $(2^*i-1)$ and $(2^*i)$ are correspondingly written in the respective "Thumbnail/List Number" section and "Use/List Number" section of the Thumbnail/List. Then, at step S1111, the respective variables "ThumbListNum" and "Thumb/UseNum" are set to $(2^*i)$ and $(2^*i-1)$, whereby the numbers $(2^*i)$ and $(2^*i-1)$ are correspondingly written in the respective "Thumbnail/List Number" section and "Use/List Number" section of the Thumbnail/List.

In either case, at step S1112, the counter i is incremented by "1", and then the control returns to step S1103. Namely, the routine comprising steps S1103 to S1112 is repeatedly executed until the determination of each pair of pictures is completed.

At step S1103, when the count number of the counter i has exceeded the set value (5) of the variable $i_{max}$, the control proceeds from step S1103 to step S1113, in which it is determined whether the number of the objects, listed in the Use/List, is odd or even. If the number of the objects is odd, the control proceeds to step S1114, in which the respective variables "ThumbListNum" and "Thumb/UseNum" are set to $(2^*i_{max}+1)$ and $(2^*i_{max}+1)$, whereby the numbers $(2^*i_{max}+1)$ and $(2^*i_{max}+1)$ are correspondingly written in the respective "Thumbnail/List Number" section and "Use/List Number" section of the Thumbnail/List. If the number of the objects is even, the control skips step S1114.

Figure 12:
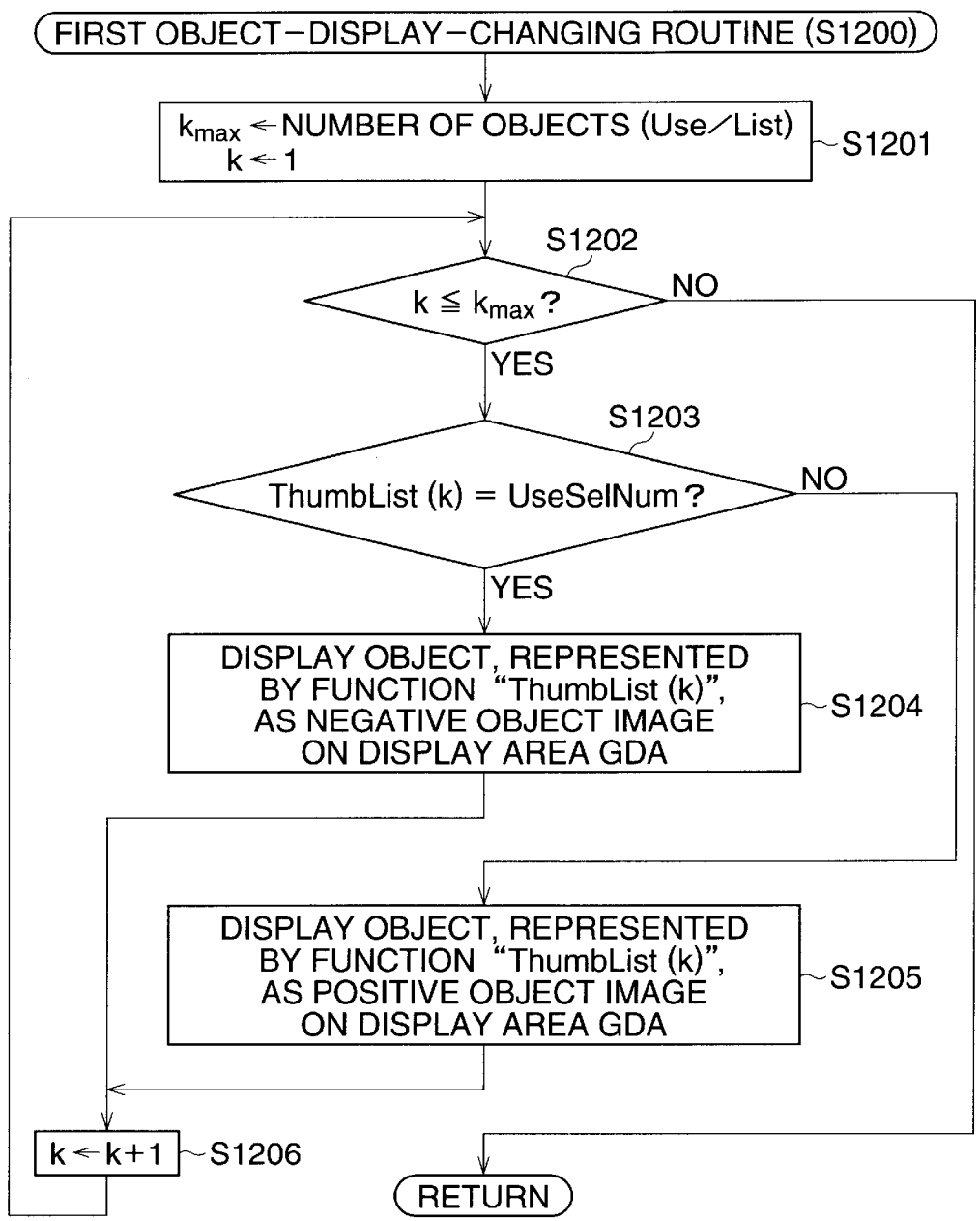
FIG. 12 is a flowchart of a first object-display-changing routine executed as a subroutine in the pair-fixing-editing routine of FIG. 10.

FIG. 12 shows a flowchart of the first object-display-changing routine executed in step S1200 of the pair-fixing-editing routine shown in FIG. 10.

At step S1201, a variable $k_{max}$ is set to the total number of objects listed in the Use/List, and a loop counter k is set to "1". For example, under the conditions of the display list table shown in FIG. 8B, $k_{max}$=11, and under the conditions of the display list table shown in FIG. 8D, $k_{max}$=10.

At step S1202, it is determined whether a count number of the loop counter k has reached the set value of the variable $k_{max}$. If $k \leq k_{max}$, the control proceeds to step S1203, it is determined whether a function "ThumbList(k)" is equal to a value of the variable "UseSelNum".

Note, the function "ThumbList(k)" is utilized to convert a thumbnail/list number into a corresponding use/list number. For example, in the Thumbnail/List shown in FIG. 8B, when a numeral 1 is substituted for "k", the function "ThumbList(1)" produces the use/list number 2 corresponding to the thumbnail/list number 1, and a numeral 4 is substituted for "k", the function "ThumbList(4)" produces the use/list number 3 corresponding to the thumbnail/list number 4.

Also, note, when an object is indicated on the display area GDA by clicking on it with the mouse 216, the variable "UseSelNum" is set to a use/list number representing the indicated object, as stated above.

In short, at step S1203, it is determined whether the object, represented by the function "ThumbList(k)", has been clicked on it with the mouse 216.

If ThumbList(k)=UseSelNum, the control proceeds to step S1204, in which the indicated object, represented by the function "ThumbList(k)", is displayed as a negative object image on the display area GDA (LDA and RDA). If ThumbList(k)≠UseSelNum, the control proceeds from step S1203 to step S1205, in which the indicated object, represented by the function "ThumbList(k)", is displayed as a positive object image on the display area GDA (LDA and RDA).

In either case, at step S1206, the counter k is incremented by "1", and the control returns to step S1202. Namely, the routine comprising steps S1202 to S1206 is repeatedly executed until the count number of the counter k reaches the set value of the variable $k_{max}$.

Figure 13:
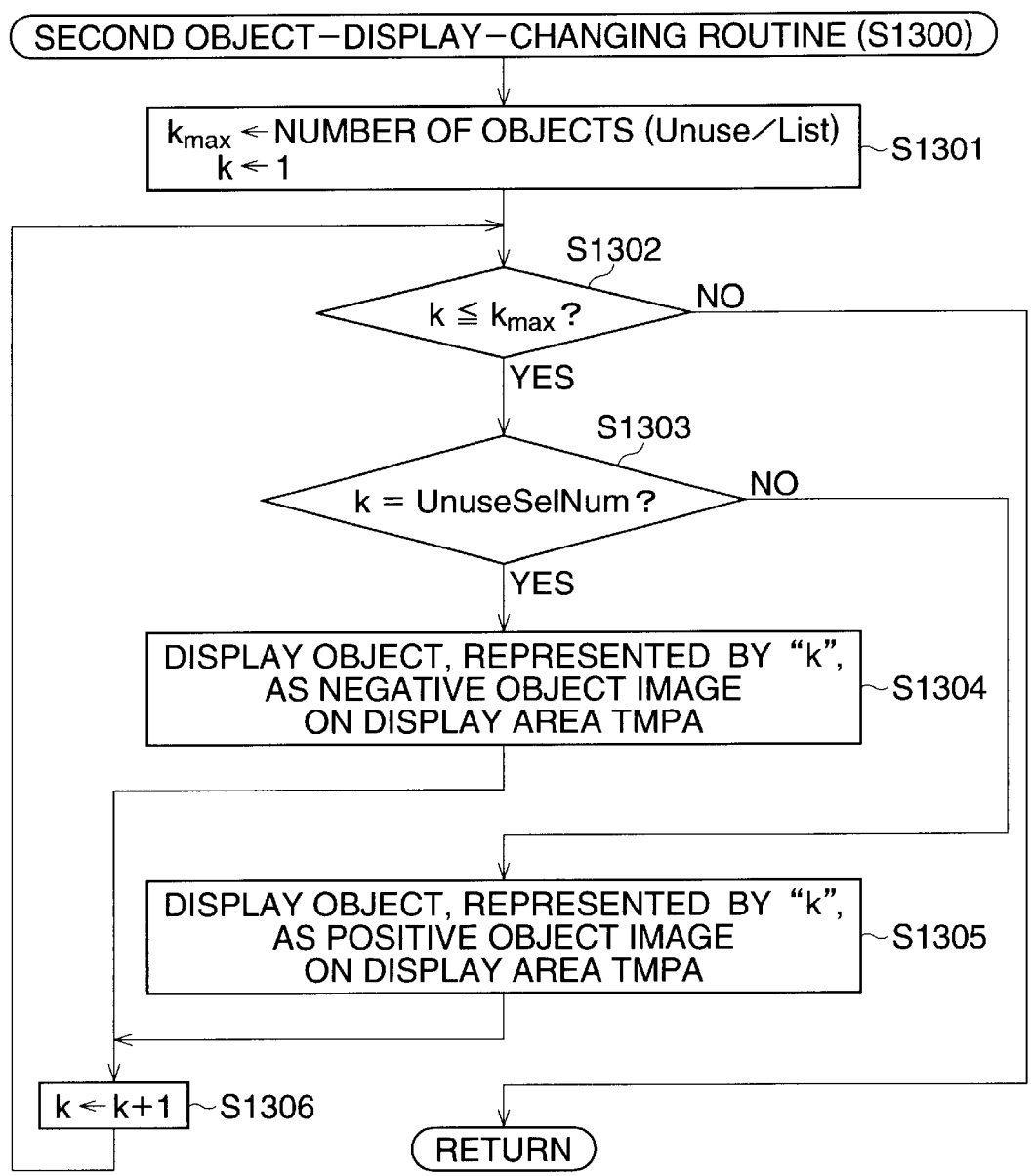
FIG. 13 is a flowchart of a second object-display-changing routine executed as a subroutine in the pair-fixing-editing routine of FIG. 10.

FIG. 13 shows a flowchart of the second object-display-changing routine executed in step S1300 of the pair-fixing-editing routine shown in FIG. 10.

At step S1301, the variable $k_{max}$ is set to the total number of objects listed in the Unuse/List, and the loop counter k is set to "1". For example, under the conditions of the display list table shown in FIG. 8D, $k_{max}$=1.

At step S1302, it is determined whether a count number of the loop counter k has reached the set value of the variable $k_{max}$. If $k \leq k_{max}$, the control proceeds to step S1303, it is determined whether "k" is equal to a value of the variable "UnuseSelNum".

Note, when an object is indicated on the picture-shunting display area TMPA by clicking on it with the mouse 216, the variable "UnuseSelNum" is set to an unuse/list number representing the indicated object. Namely, at step S1303, it is determined whether the object, represented by "k", has been clicked on it with the mouse 216.

If k=UnuseSelNum, the control proceeds to step S1304, in which the indicated object, represented by "k", is displayed as a negative object image on the picture-shunting display area TMPA. If k≠UnuseSelNum, the control proceeds from step S1303 to step S1305, in which the indicated object, represented by "k", is displayed as a positive object image on the display area TMPA.

In either case, at step S1306, the counter k is incremented by "1", and the control returns to step S1302. Namely, the routine comprising steps S1302 to S1306 is repeatedly executed until the count number of the counter k reaches the set value of the variable $k_{max}$.

Figure 14:
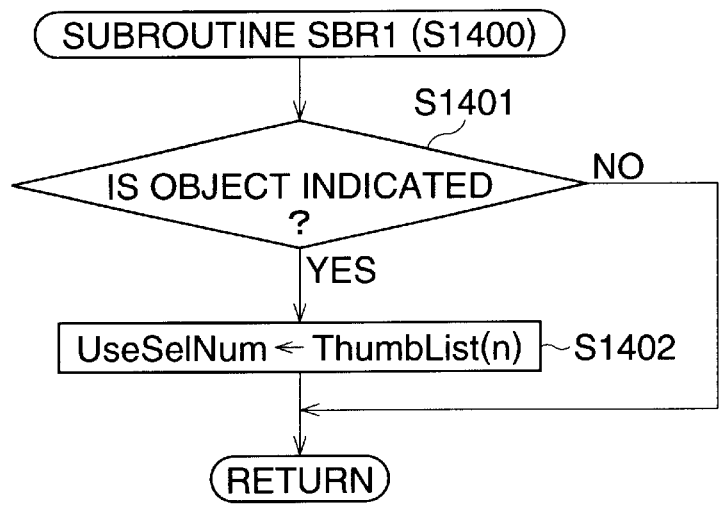
FIG. 14 is a flowchart of a first subroutine executed in the pair-fixing-editing routine of FIG. 10.

FIG. 14 shows a flowchart for the subroutine SBR1 executed at step S1400 of the pair-fixing-editing routine shown in FIG. 10. Of course, the execution of the subroutine SBR1 is started when the clicking operation is performed provided that the pointer is on the picture-arranging-display area GDA.

At step S1401, it is determined whether the clicking operation is performed provided that any one of the objects displayed on the picture-arranging-display area GDA is indicated by the pointer. If the pointer is not on an object displayed on the display area GDA, the subroutine SBR1 ends. Namely, the clicking operation is ignored when the pointer is not on any object displayed on the display area GDA.

At step S1401, when it is confirmed that the clicking operation is performed provided that the object is indicated by the pointer, the control proceeds to step S1402, in which the variable "UseSelNum" is set to the function "thumbList (n)".

Note, "n" is a thumbnail/list number representing a display location at which an object is displayed on the picture-arranging display area GDA (LDA and RDA). Thus, for example, in FIG. 7A, when the object OB3 is clicked on it with the mouse 216, "n" is the thumbnail/list number 4, and thus the function "thumbList(4)" produces the use/list number 3 representing the object OB3 (FIG. 8B). In short, at step S1402, the variable "UseSelNum" is set to a use/list number representing the object indicated by clicking on it with the mouse 216 on the display area GDA (LDA and RDA).

Figure 15:
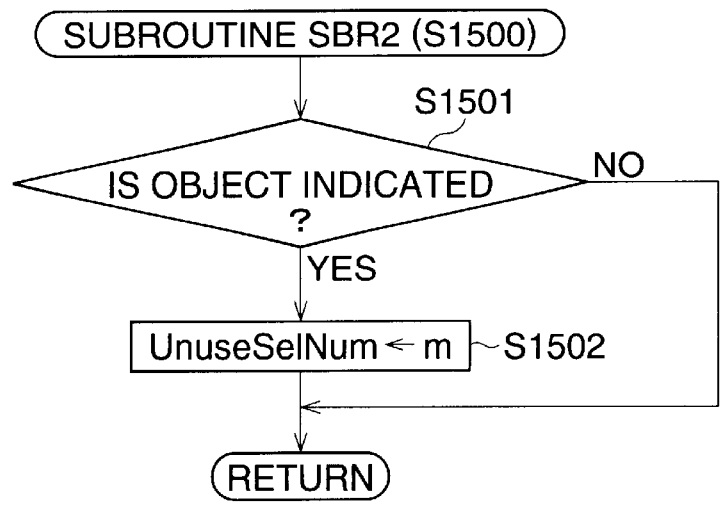
FIG. 15 is a flowchart of a second subroutine executed in the pair-fixing-editing routine of FIG. 10.

FIG. 15 shows a flowchart for the subroutine SBR2 executed at step S1500 of the pair-fixing-editing routine shown in FIG. 10. Of course, the execution of the subroutine SBR2 is started when the clicking operation is performed provided that the pointer is on the picture-shunting-display area TMPA.

At step S1501, it is determined whether the clicking operation is performed provided that any one of the objects displayed on the picture-shunting-display area TMPA is indicated by the pointer. If the pointer is not on an object displayed on the display area TMPA, the subroutine SBR2 ends. Namely, the clicking operation is ignored when the pointer is not on any object displayed on the display area TMPA.

At step S1501, when it is confirmed that the clicking operation is performed provided that the object is indicated by the pointer, the control proceeds to step S1502, in which the variable "UnuseSelNum" is set to "m". Note, "m" is an unuse/list number representing a display location at which an object is displayed on the picture-shunting display area TMPA. For example, in FIG. 7B, when the object OB3 is clicked on it with the mouse 216, "m" is the unuse/list number 1 representing a display position at which the object OB3 is displayed on the display area TMPA (FIG. 7B). In short, at step S1502, the variable "UnuseSelNum" is set to a unuse/list number representing an object indicated by clicking on it with the mouse 216 on the display area TMPA.

Figure 16:
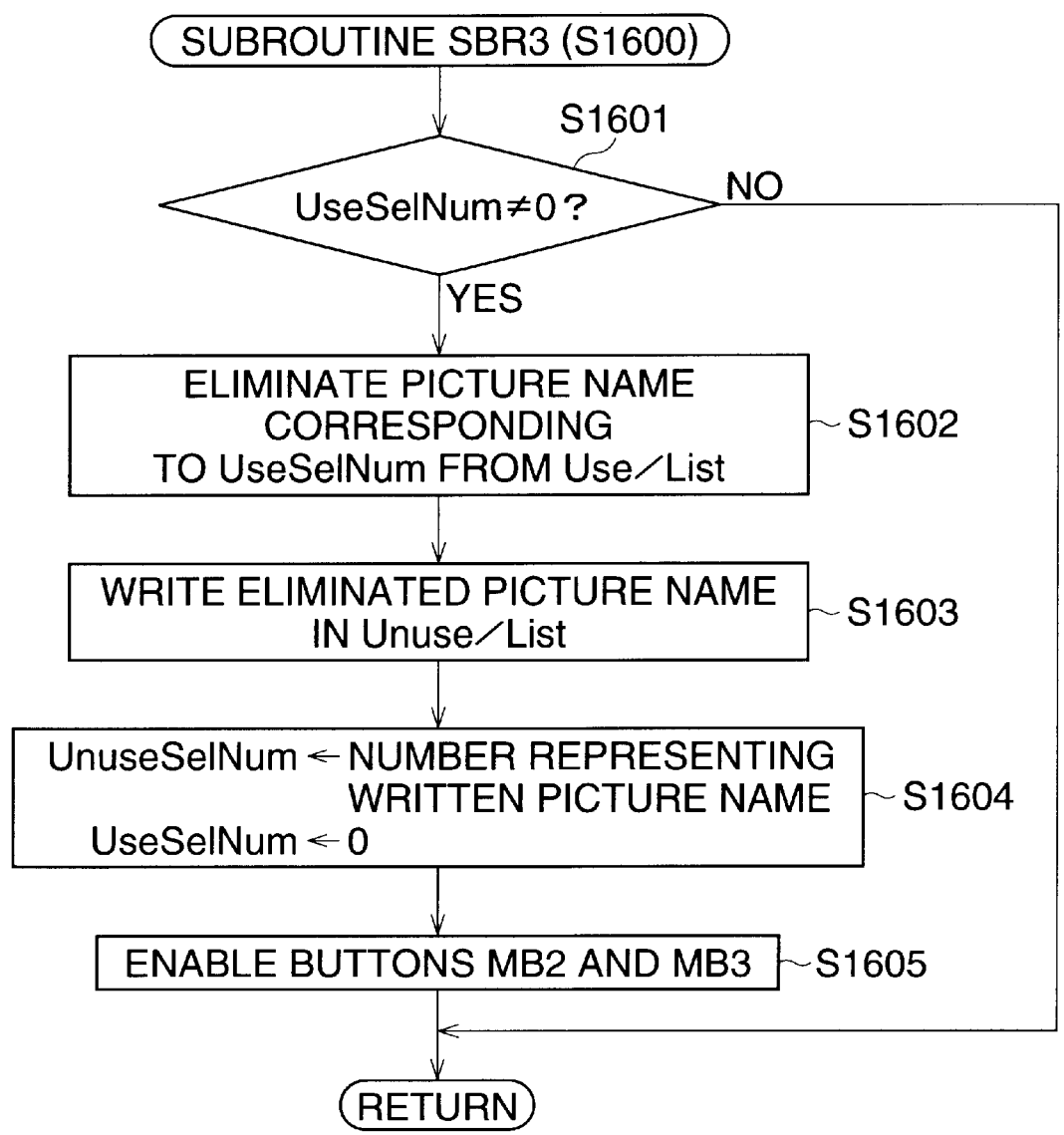
FIG. 16 is a flowchart of a third subroutine executed in the pair-fixing-editing routine of FIG. 10.

FIG. 16 shows a flowchart for the subroutine SBR3 executed at step S1600 of the pair-fixing-editing routine shown in FIG. 10. Of course, the execution of the subroutine SBR3 is started when the clicking operation is performed provided that the first object-transfer button MB1 is indicated by the pointer.

At step S1601, it is determined whether the variable "UseSelNum" is not "0". If UseSelNum≠0, i.e. if any one of the objects, displayed on the picture-arranging-display area GDA, is indicated by clicking on it with the mouse 216, the control proceeds to step S1602, in which a picture name, corresponding to a value of the variable "UseSelNum", i.e. representing the indicated object, is eliminated from the "Picture Name" section of the Use/List.

Note, when the picture name is eliminated from the "Picture Name" section of the Use/List, the picture names, following the eliminated picture name, are moved up and renumbered. Namely, for example, the picture name "IM3" is eliminated from the "Picture Name" section of the Use/ List, and the respective picture names "IM4" to "IM11", following the eliminated picture name IM3, are moved up and renumbered by the use/list numbers 3 to 10, as shown in FIG. 8C.

At step S1603, the eliminated picture name is written together with a corresponding unuse/list number in the Unuse/List, resulting in a transfer of the indicated object from the display area GDA (LDA and RDA) to the display area TMPA. Note, if the Unuse/List is empty, the unuse/list number concerned is listed at the first list-position of the "Unuse/List Number" section of the Unuse/List. Namely, for example, as shown in FIG. 8C, the eliminated picture name "IM3" and the corresponding unuse/list number 1 are correspondingly written in the respective "Picture Name" section and "Unuse/List Number" section of the Unuse/List.

At step S1604, the variable "UnuseSelNum" is set to the unuse/list number representing the picture name written in the "Picture Name" section of the Unuse/List, and the variable "UseSelNum" is reset to "0". Then, at step S1605, the second and third object-transfer buttons M2 and M3 are enabled due to the transfer of the object from the display area GDA to the display area TMPA. The enabled buttons M2 and M3 are displayed at a higher displaying-density, whereby it can be visually recognized by the operator that the buttons M2 and M3 are enabled.

Note, when the object concerned is transferred from the picture-arranging display area GDA to the picture-shunting display area TMPA, the object is displayed as a negative object image on the display area TMPA, due to the setting of the unuse/list number concerned to the variable "UnuseSelNum" (S1604), because the object, transferred to the display area TMPA, may be frequently returned immediately to the display area GDA while the objects are rearranged on the pair-fixing-editing scene of the monitor 214.

At step S1601, if UseSelNum=0, i.e. if none of the objects, displayed on the picture-arranging-display area GDA, is indicated by clicking on it with the mouse 216, the subroutine SBR3 ends. Namely, when no object is selected on the display area GDA, the operation of the first object-transfer button MB1 is ignored.

Figure 17:
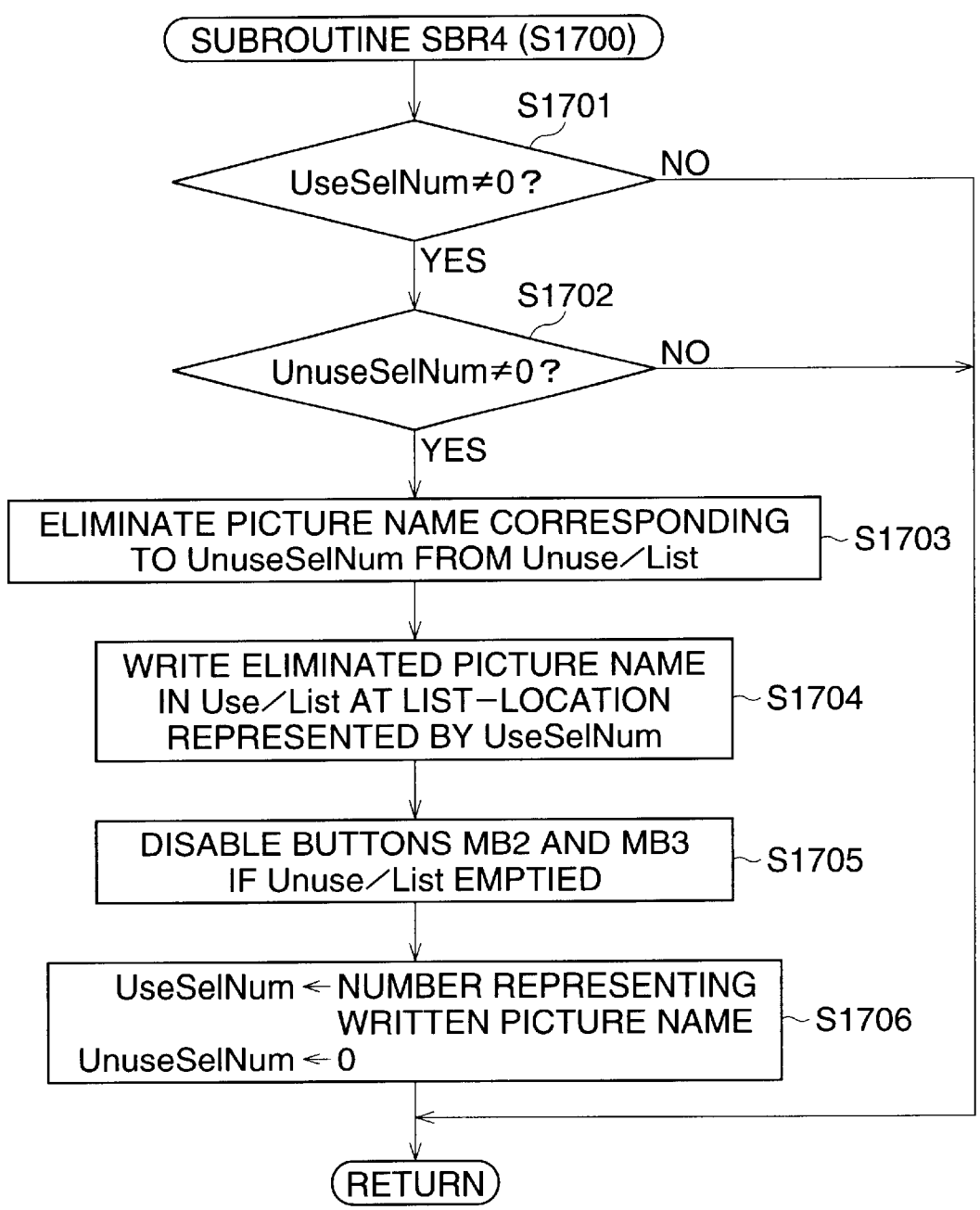
FIG. 17 is a flowchart of a fourth subroutine executed in the pair-fixing-editing routine of FIG. 10.

FIG. 17 shows a flowchart for the subroutine SBR4 executed at step S1700 of the pair-fixing-editing routine shown in FIG. 10. Of course, the execution of the subroutine SBR4 is started when the clicking operation is performed provided that the second object-transfer button MB2 is indicated by the pointer.

At step S1701, it is determined whether the variable "UseSelNum" is not "0". If UseSelNum≠0, i.e. if any one of the objects, displayed on the picture-arranging-display area GDA, is indicated by clicking on it with the mouse 216, the control proceeds to step S1702, in which it is determined whether the variable "UnuseSelNum" is not "0". If UnuseSelNum≠0, i.e. if any one of the objects, displayed on the picture-shunting-display area TMPA, is indicated by clicking on it with the mouse 216, the control proceeds to step S1703, in which a picture name, corresponding to a value of the variable "UnuseSelNum", i.e. representing the object indicated on the display area TMPA, is eliminated from the "Picture Name" section of the Unuse/List.

At step S1704, the eliminated picture name is written in the "Picture Name" section of the Use/List to be inserted in the list-location represented by a value of the variable "UseSelNum", resulting in a return of the object concerned from the display area TMPA to the display area GDA. Note, when the picture name concerned is inserted in the list-location represented by the value of the variable "UseSelNum", the picture names following the inserted picture name are moved down and renumbered in the Use/list.

At step S1705, the second and third object-transfer buttons MB2 and MB3 are disabled if the Unuse/List is emptied due to the return of the object concerned from the display area TMPA to the display area GDA. Of course, if at least one unuse/list number is still listed in the "Unuse/List Number" section of the Unsue/List, the buttons MB2 and MB3 remain enabled.

At step S1706, the variable "UseSelNum" is set to the use/list number representing the picture name inserted in the "Picture Name" section of the Use/List, and the variable "UnuseSelNum" is reset to "0".

At step S1701, if UseSelNum=0, i.e. if none of the objects, displayed on the picture-arranging-display area GDA, is indicated by clicking on it with the mouse 216, the subroutine SBR4 ends. Namely, when no object is selected on the display area GDA, the operation of the second object-transfer button MB2 is ignored.

Similarly, at step S1702, if UnuseSelNum=0, i.e. if none of the objects, displayed on the picture-shunting-display area TMPA, is indicated by clicking on it with the mouse 216, the subroutine SBR4 ends. Namely, when no object is selected on the display area TMPA, the operation of the second object-transfer button MB2 is ignored.

Figure 18:
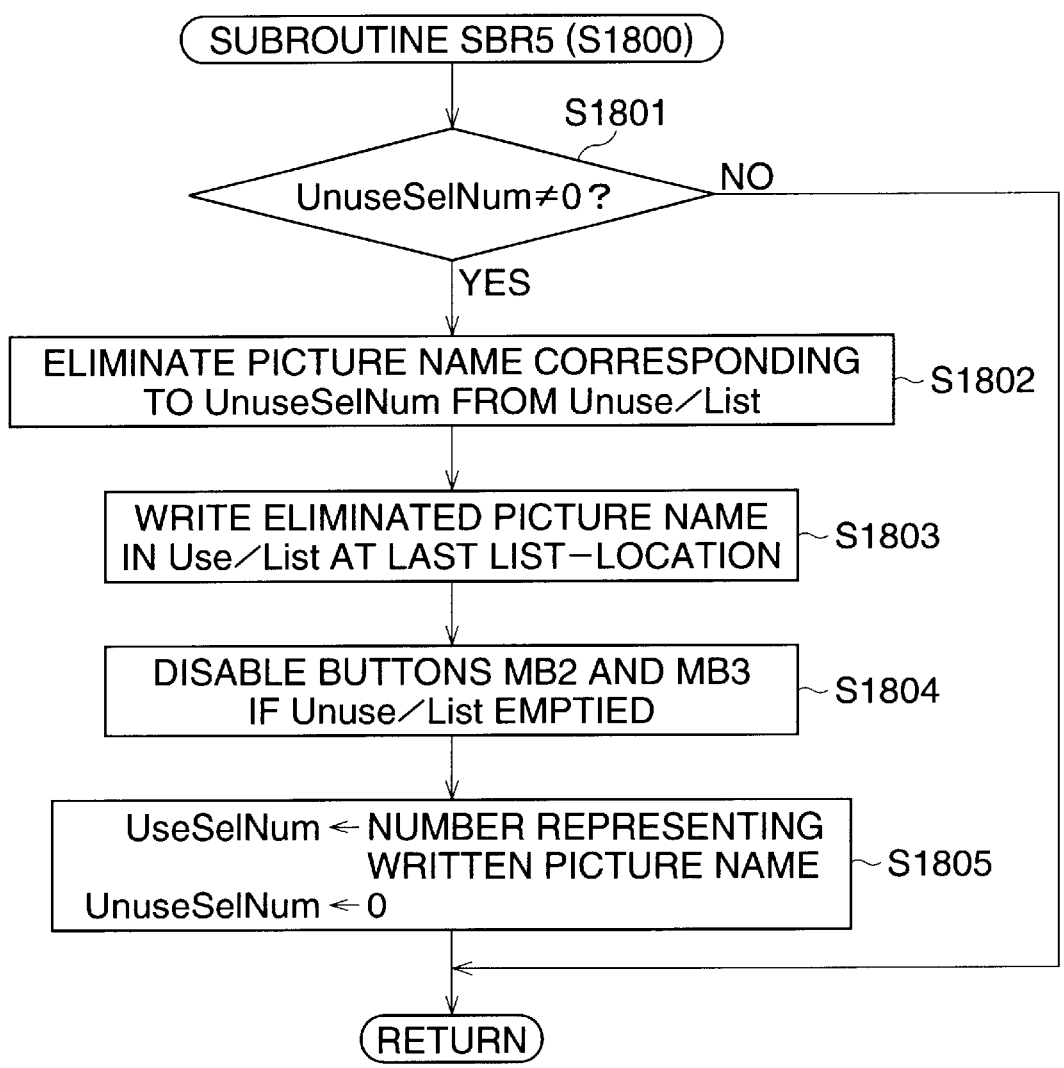
FIG. 18 is a flowchart of a fifth subroutine executed in the pair-fixing-editing routine of FIG. 10.

FIG. 18 shows a flowchart for the subroutine SBR5 executed at step S1800 of the pair-fixing-editing routine shown in FIG. 10. Of course, the execution of the subroutine SBR5 is started when the clicking operation is performed provided that the third object-transfer button MB3 is indicated by the pointer.

At step S1801, it is determined whether the variable "UnuseSelNum" is not "0". If UnuseSelNum≠0, i.e. if any one of the objects, displayed on the picture-shunting-display area TMPA, is indicated by clicking on it with the mouse 216, the control proceeds to step S1802, in which a picture name, corresponding to a value of the variable "UnuseSelNum", i.e. representing the object indicated on the display area TMPA, is eliminated from the "Picture Name" section of the Unuse/List.

At step S1803, the eliminated picture name is written in "Picture Name" section of the Use/List to be listed at a last list-location thereof, resulting in a return of the object concerned from the display area TMPA to the display area GDA.

At step S1804, the second and third object-transfer buttons MB2 and MB3 are disabled if the Unuse/List is empty due to the return of the object concerned from the display area TMPA to the display area GDA. Of course, if at least one unuse/list number is still listed in the "Unuse/List Number" section of the Unsue/List, the buttons MB2 and MB3 remain enabled.

At step S1805, the variable "UseSelNum" is set to the use/list number representing the picture name written in the "Picture Name" section of the Use/List, and the variable "UnuseSelNum" is reset to "0".

At step S1801, if UnuseSelNum=0, i.e. if none of the objects, displayed on the picture-shunting-display area TMPA, is indicated by clicking on it with the mouse 216, the subroutine SBR5 ends. Namely, when no object is selected on the display area TMPA, the operation of the second object-transfer button MB3 is ignored.

Figure 19:
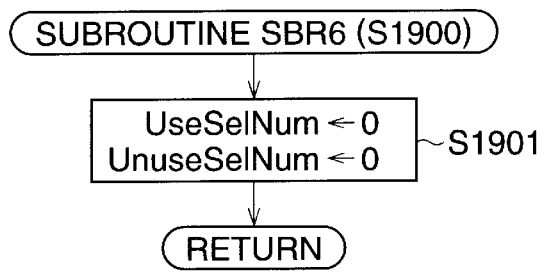
FIG. 19 is a flowchart of a sixth subroutine executed in the pair-fixing-editing routine of FIG. 10.

FIG. 19 shows a flowchart for the subroutine SBR6 executed at step S1900 of the pair-fixing editing routine shown in FIG. 10. Of course, the execution of the subroutine SBR6 is started when the clicking operation is performed provided that the cancel button CSB is indicated by the pointer.

At step S1901, the variable "UseSelNum" is reset to "0", and the variable "UnuseSelNum" is reset to "0". For example, an object may be erroneously indicated on either the display area GDA (LDA and RDA) or TMPA by clicking on it with the mouse 216. In this case, it is possible to immediately cancel the erroneous indication of the object by operating the cancel button CSB by clicking on it with the mouse 216. Also, although an object, transferred from one of the display areas GDA and TMPA to the other display area, is displayed as a negative object image (S1604, S1706, S1805), it is possible to immediately convert the negative object image into a positive object image by operating the cancel button CSB by clicking on it with the mouse 216.

Figure 20:
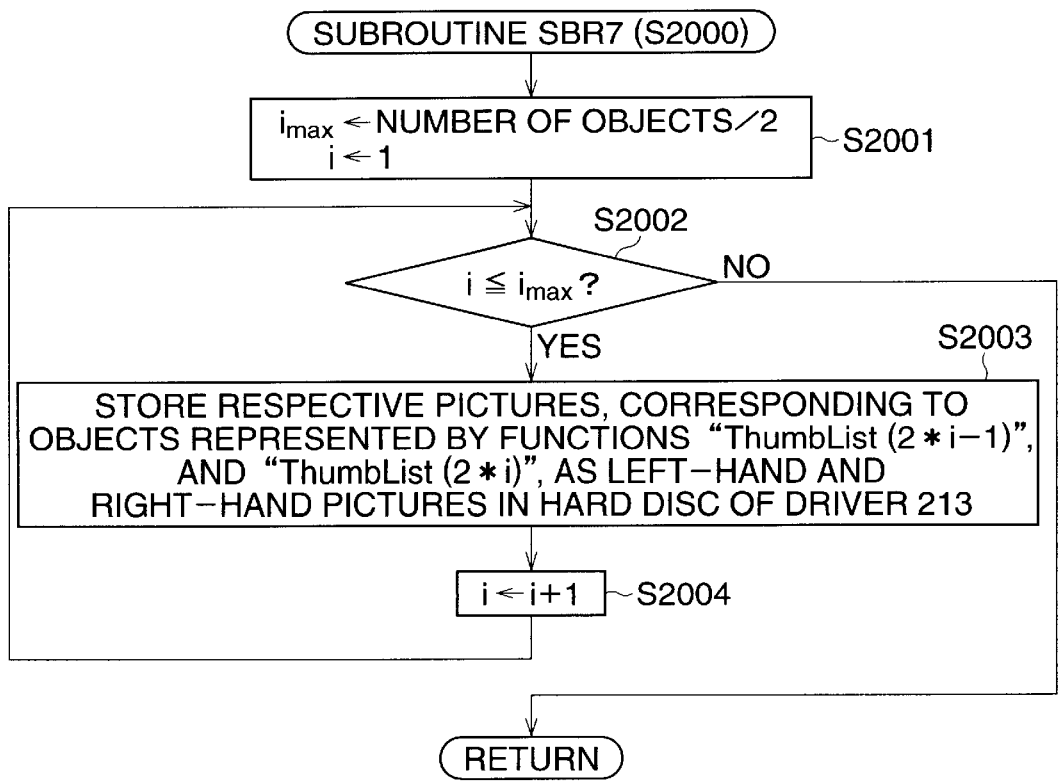
FIG. 20 is a flowchart of a seventh subroutine executed in the pair-fixing-editing routine of FIG. 10.

FIG. 20 shows a flowchart for the subroutine SBR7 executed at step S2000 of the pair-fixing editing routine shown in FIG. 10. Of course, the execution of the subroutine SBR7 is started when the clicking operation is performed provided that the completion button CIB is indicated by the pointer.

At step S2001, the variable $i_{max}$ is set to a quotient obtained when dividing a total number of the objects, listed in the Use/List, by two, and the loop counter i is set to "1".

At step S2002, it is determined whether a count number of the loop counter i has reached the set value of the variable $i_{max}$. If $i \leq i_{max}$, the control proceeds to step S2003, in which respective matching pictures, corresponding to objects represented by the function "ThumbList(2*i−1)" and the function "ThumbList(2*i)", are fixed and stored as left-hand and right-hand pictures in the hard disc of the hard disc driver 213. Then, at step S2004, the counter i is incremented by "1", and the control returns to step S2002. Namely, the routine comprising steps S2002, S2003 and S2004 is repeatedly executed until the count number of the counter i reaches the set value of the variable $i_{max}$.

Note, the fixed left-hand and right-hand pictures are still held in the working memory 244 for the execution of the survey-map-production routine (S906). Also, note, the fixed left-hand and right-hand pictures may be stored in the optical disc of the magneto-optical disc driver 215, if necessary.

Usually, the completion button CIB is operated when the rearrangement of objects for fixing proper pairs of pictures for producing survey map sections is completed. Nevertheless, the completion button CIB may be operated when the rearrangement of objects is suspended. In this case, the left-hand and right-hand pictures are provisionally fixed and stored in the hard disc of the hard-disc driver 213 and/or the optical disc of the magneto-optical disc driver 215. When rearrangement of the objects is resumed, the provisionally-fixed left-hand and right-hand pictures are read from the hard disc of the hard-disc driver 213 and/or the optical disc of the magneto-optical disc driver 215.

When the completion button CIB is operated, i.e. when the pair-fixing-editing ends, the pair-fixing-editing scene of the monitor 214 is returned to the initial menu scene. Of course, in the example shown in FIGS. 7A and 7B, the pair-fixing-editing routine is successfully completed, the five proper pairs of left-hand and light-hand pictures IM2 (OB2) and IM1 (OB1); IM5 (OB5) and IM4(OB4); IM6 (OB6) and IM7(OB7); IM8(OB8) and IM9(OB9); and IM11 (OB11) and IM10(OB10) are fixed and retained to produce five survey map sections.

Figure 21:
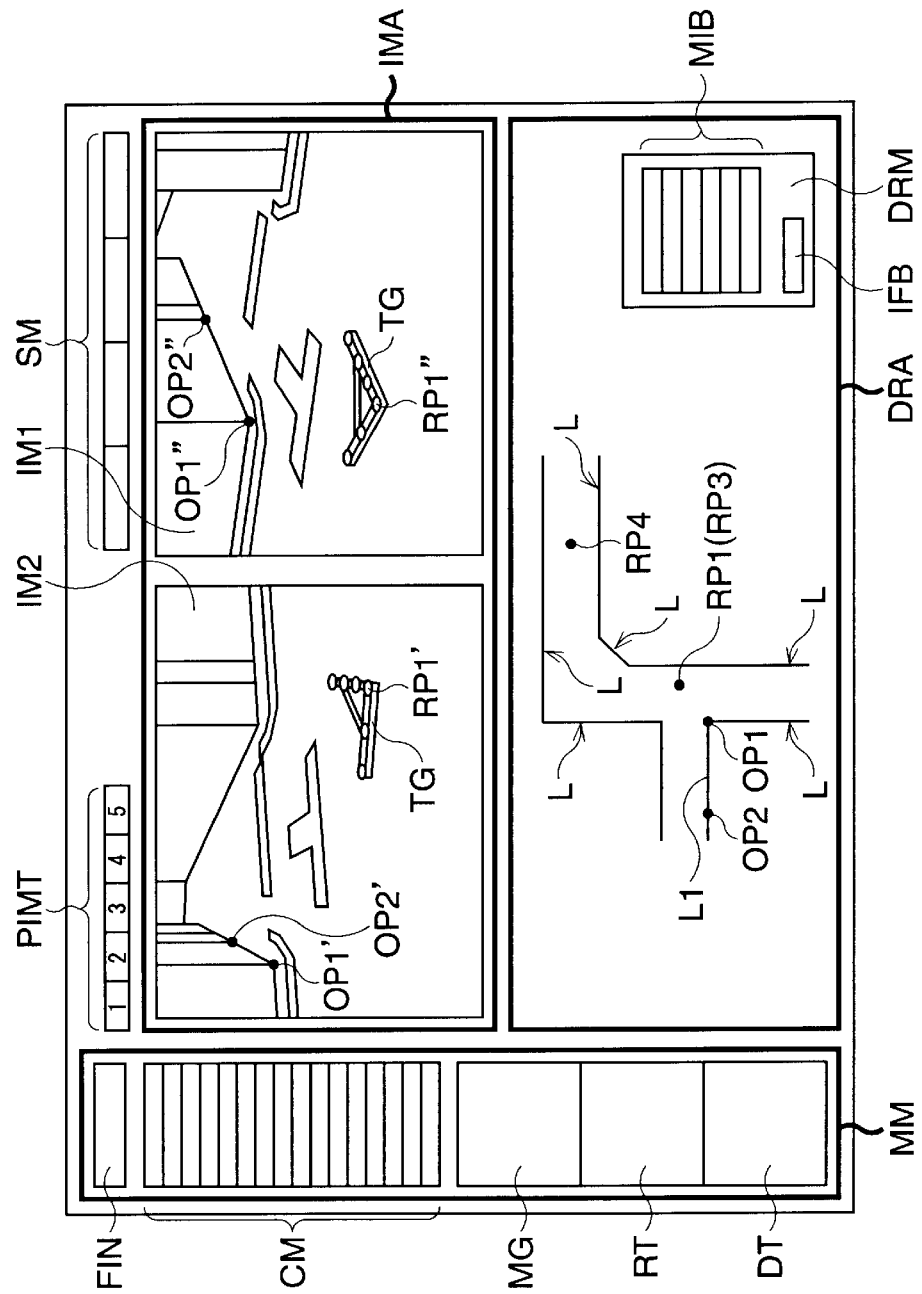
FIG. 21 is a view showing by way of example a survey-map-production scene of the monitor shown in FIG. 6.

FIG. 21 shows, by way of example, a survey-map-production scene which is displayed on the monitor 214 while the survey-map-production routine is executed in step S906 of the main routine shown in FIG. 9. Note, the survey-map-production scene may be selected from the initial menu scene by operating, for example, a survey-map-production button with the mouse 216.

As shown in FIG. 21, the survey-map-production scene includes a pair-picture-display area IMA, a survey-map-production display area DRA positioned below the pair-picture-display area IMA, and a main-menu-display area MM positioned on the left side of the display areas IMA and DRA. The survey-map-production scene further includes a tag-bar PIMT and a submenu-bar SM display along the top of the pair-picture-display area IMA. As is apparent from FIG. 21, the tag-bar PIMT includes plural tag-buttons aligned with each other, and the submenu bar SM includes plural submenu-buttons aligned with each other.

On the pair-picture-display area IMA, two pictures are displayed in each proper pair for producing a survey map section. In the example of FIG. 21, although the two pictures in the first proper pair, indicated by references IM1 and IM2, are displayed side by side on the pair-picture-display area IMA, two pictures to be displayed on the display area IMA can be optionally selected by operating one of the tag-buttons by clicking on it with the mouse 216.

In particular, the number of the tag-buttons included in the displayed tag-bar PIMT depends on the number of the proper pairs of pictures. In the example shown in FIG. 21, since there are the five matched pairs of pictures, the number of the tag-buttons is five, and numbers "1" to "5" are displayed on the five tag-buttons. Of course, the respective numbers "1" to "5" correspond to the first, second, third, fourth, and fifth pairs of pictures IM2 and IM1; IM5 and IM4; IM6 and IM7; IM8 and IM9; and IM11 and IM10, respectively. When the tag-button having the displayed number "1" is operated by clicking on it with the mouse 216, the first pair of pictures IM2 and IM1 is displayed on the pair-picture-display area IMA, as shown in FIG. 21.

Note, the operated tag-button is displayed as if being depressed, whereby its operation can be visually confirmed.

In the example of FIG. 21, an unfinished survey map is displayed on the survey-map-production display area DRA. Of course, the survey map is produced based on the five pairs of pictures. In the unfinished survey map, the target positions RP1, RP2 and RP3 may be optionally displayed on the display area DRA at the beginning of the production of the survey map. Note, each of the displayed target positions RP1, RP2 and RP3 is represented by the center of the circular plate-like element $CE_1$ (FIG. 3) of the target TG.

A first survey map section of the displayed survey map is produced on the basis of the left-hand and right-hand pictures IM2 and IM1 in the first proper pair. In particular, when two object points, corresponding to each other on the pictures IM2 and IM1, are consecutively indicated by clicking on them with the mouse 216, three-dimensional coordinates of an object point, represented by the photographed object points, are calculated with respect to the X-Y-Z coordinate system defined on the photographed target TG located at the first target position RP1. Then, the calculated coordinates of the object point concerned is projected on the plane defined by the X- and Z-axes of the X-Y-Z coordinate system, thereby producing the first survey map section based on the first pair of left-hand and right-hand pictures IM2 and IM1.

For example, an object point OP1, shown on the survey map, corresponds to a photographed object point OP1' on the left-hand picture IM2, and corresponds to a photographed object point OP1" on the right-hand picture IM1. By indicating the photographed object points OP1' and OP1" by clicking on them with the mouse 216, to the object point OP1 is determined on the survey-map-production display area DRA. Similarly, an object point OP2, corresponding to respective photographed points OP2' and OP2" on the left-hand and right-hand pictures IM2 and IM1, is determined on the survey-map-production display area DRA.

Note, in reality, an indicated object point (OP1, OP2, OP1', OP1", OP2', OP2") is represented by a colored small dot displayed on a corresponding picture.

After the determination of the two object points OP1 and OP2, a line segment L1 is drawn and displayed between the object points OP1 and OP2, as shown in FIG. 21. The drawing of the line segment L1 is performed by previously selecting and setting a straight-line-drawing mode in a drawing-menu window DRM displayed on the survey-map-production-display area DRA.

The drawing-menu window DRM includes a plurality of item-buttons, generally indicated by reference MIB, which correspond to various line-drawing modes. Of course, one of the line-drawing modes is the aforesaid straight-line-drawing mode, and other modes may be a curve-line-drawing mode, a diameter-designated-circular-drawing mode, a radius-designated-circular-drawing mode and so on. One of the various line-drawing modes is selected and set by operating a corresponding item button MIB by clicking on it with the mouse 216.

The drawing-menu window DRM further has an input-fixing button IFB, which is operated by clicking on it with the mouse 216 after object points necessary for drawing a line segment or line segments are displayed on the display area DRA. In particular, for example, after the object points OP1 and OP2 are displayed on the survey-map-production-display area DRA, the drawing of the line-segment L1 between the displayed object points OP1 and OP2 is performed by the operation of the input-fixing button IFB provided that the straight-line-drawing mode is selected and set.

Thus, as shown in FIG. 21 by way example, it is possible to draw and display lines L, representing the roadway, on the display area DRA by repeating indication of plural pairs of object points, representing the roadway and corresponding to each other on the left-hand and right-hand pictures IM2 and IM1.

The main-menu-display area MM includes various command-item buttons, representatively indicated by reference CM, and each of the command-item buttons is operated by clicking on it with the mouse 216. By selectively operating the command-item buttons CM, a corresponding command mode is selected and set.

For example, when a map-drawing-command mode is selected, the aforesaid processing for the production of the survey map section is enabled. When a map-symbol-inputting-command mode is selected, a selection of a given map symbol from a previously-prepared map symbol list and an addition of the selected map symbol to the survey map are enabled. When a user-symbol-inputting-command mode is selected, a selection of a given symbol from a user-previously-prepared symbol list and an addition of the selected symbol to the survey map are enabled.

Also, when a character-inputting-command mode is selected, it is possible to add characters to the survey map by inputting character codes through the keyboard 217. Of course, when the character code data is input, the character code data is converted into character image data, which is output to the display memory 242, whereby character images are displayed on the survey-map-production-display area DRA. When a measurement-command mode is selected, it is possible to calculate a distance between two locations, indicated with the mouse 216, based on the standard distance defined by the target TG. When a map-editing-command mode is selected, it is possible to suitably edit the survey map, symbols and characters displayed on the display area DRA. When a map-correcting-command mode is selected, it is possible to suitably correct a part of the displayed survey map. When a printing-command mode is selected, it is possible to print the displayed survey map on a sheet of paper by the printer 218 connected to the CPU210 via the output interface controller 228. When a map-preserving-command mode is selected, it is possible to store survey map data representing the display survey map in the hard disc of the hard-disc driver 213 and/or the optical disc of the magneto-optical disc driver 215.

Further, one of the command-item buttons CM is used as a canceling-button. When a processing is erroneously performed during one of various aspects of the production of the survey map, the erroneous processing can be canceled by clicking the cancel button with the mouse 216. Another of the command-item buttons CM is used as a deleting-button, and it is possible to suitably delete a part of the displayed survey map by clicking the deleting-button with the mouse 216.

The main-menu-display area MM also includes three setting-menu sections MG, RT and DT. The setting-menu section MG is provided for altering a setting of a power-magnification of the displayed survey map. The setting-menu section RT is provided for altering a setting of a rotational display-position of the survey map. The setting-menu section DT is provided for altering settings of a type, a thickness, a color or the like of a drawing-line.

Further, the main-menu-display area MM includes a finish button FIN. Whenever the finish button FIN is operated by clicking on it with the mouse 216, the map-preserving-command mode is forcibly selected, and it is determined whether the displayed survey map should be stored and preserved in the hard disc of the image-processing computer system and/or the optical disc of the magneto-optical disc driver 215. In any event, after either selection, the survey-map-production display scene (FIG. 21) of the monitor 10 is returned to the initial menu scene.

One of the submenu-buttons of the aforesaid submenu bar SM is provided for altering the title data of each picture. As already mentioned above, each of the pictures carries title data stored in a subheader area H1 of a corresponding memory-area section of the memory card 180. When the submenu button concerned is operated by clicking on it with the mouse 216, a title-altering mode is selected for suitably altering the title data of each picture. Also, the other submenu-buttons of the submenu bar SM are provided for resetting previously-given various settings.

Finally, it will be understood by those skilled in the art that the foregoing description is of a preferred embodiment of the system, and that various changes and modifications may be made to the present invention without departing from the spirit and scope thereof.

The present disclosure relates to subject matters contained in Japanese Patent Applications No. 2000-075549 (filed on Mar. 17, 2000) which is expressly incorporated herein, by reference, in its entirety.

What is claimed is:

1. An image processing computer system for a photogrammetric analytical measurement in which a survey map is produced on the basis of plural pairs of pictures photographed at different positions, each picture including a photographed target, said system comprising:

a memory that stores plural frames of image data for said pictures;

an image-data-reading controller that reads the plural frames of image data from said memory in a predetermined order such that two consecutive frames of image data form a pair of pictures;

a monitor that displays two pictures in each pair side by side thereon to rearrange the displayed pictures such that two pictures displayed side by side form a proper pair for producing a survey map section; and a determiner that determines whether two pictures displayed side by side are defined as left-hand and right-hand pictures or right-hand and left-hand pictures with respect to the targets photographed thereon, whereby left-hand and right-hand pictures in each pair are displayed at left and right sides on said monitor, said determiner comprising:

a first calculator that calculates photographing positions of the pictures displayed side by side with respect to coordinate systems defined on the photographed targets;

a vector-definer that defines two vectors directed from origins of the coordinate systems to said photographing positions; and a second calculator that calculates an outer product of said two vectors, whereby the determination is performed by said determiner on the basis of whether the calculated outer product is positive or negative.

2. An image processing computer system as set forth in claim 1, wherein said two vectors are defined as first and second vectors derived from the two pictures in each pair which are consecutively read from said memory, and said outer product is calculated by said second calculator as an outer product of said second vector to said first vector, the two pictures, represented by said first and second vectors, being defined as the left-hand and right-hand pictures by said determiner when said outer product is positive, and the two pictures, represented by said first and second vectors, being defined as the right-hand and left-hand pictures by said determiner when said outer product is negative.

3. An image processing computer system as set forth in claim 1, further comprising a memory card reader in which said memory is loaded as a memory card.

4. An image processing computer system as set forth in claim 1, wherein said memory comprises a working memory forming a part of said image processing computer system.

5. An image processing computer system for a photogrammetric analytical measurement in which a survey map is produced on the basis of plural pairs of pictures photographed at different positions, each picture including a photographed target, said system comprising:

a memory that stores plural frames of image data for said pictures;

an image-data-reading controller that reads the plural frames of image data from said memory in a predetermined order such that two consecutive frames of image data form a pair of pictures;

a monitor that displays a pair-fixing-editing scene including a picture-arranging display area and a picture-shunting display area, said picture-arranging display area being divided into a left-hand display area and a right-hand display area;

a first monitor controller that displays two pictures in each pair side by side on the left-hand and right-hand display areas of said picture-arranging display area;

a second monitor controller that transfers a displayed picture from said picture-arranging display area to said picture-shunting display area; and a third monitor controller that returns the transferred picture from said picture-shunting display area to said picture-arranging display area such that the picture returned is displayed at a desired display location on said picture-arranging display area;

wherein the pictures, displayed on said picture-arranging display area, are rearranged using said second and third monitor controllers such that two pictures, displayed side by side on the left-hand and right-hand display areas of said picture-arranging display area, form a proper pair for producing a survey map section, and wherein said first monitor controller has a determiner that determines whether two pictures displayed side by side are defined as left-hand and right-hand pictures or right-hand and left-hand pictures with respect to the targets photographed thereon, whereby left-hand and right-hand pictures in each pair are displayed on the left-hand and right-hand display areas of said picture-arranging display area the determiner comprising:
- a first calculator that calculates photographing positions of the pictures displayed side by side with respect to coordinate systems defined on the photographed targets;
- a vector-definer that defines two vectors directed from origins of the coordinate systems to said photographing positions; and
- a second calculator that calculates an outer product of said two vectors, whereby the determination is performed by the determiner on the basis of whether the calculated outer product is positive or negative.

6. An image processing computer system as set forth in claim 5, wherein said two vectors are defined as first and second vectors derived from the two pictures in each pair which are consecutively read from said memory, and said outer product is calculated by said second calculator as an outer product of said second vector to said first vector,
- the two pictures, represented by said first and second vectors, being defined as the left-hand and right-hand pictures by said determiner when said outer product is positive, and
- the two pictures, represented by said first and second vectors, being defined as the right-hand and left-hand pictures by said determiner when said outer product is negative.

7. An image processing computer system as set forth in claim 5, further comprising a memory card reader in which said memory is loaded as a memory card.

8. An image processing computer system as set forth in claim 5, wherein said memory comprises a working memory forming a part of said image processing computer system.

* * * * *